(12) United States Patent
Islam et al.

(10) Patent No.: US 11,115,098 B2
(45) Date of Patent: Sep. 7, 2021

(54) CONFIGURATION AND DESIGN OF CQI AND MCS TABLES FOR 5G COMMUNICATIONS

(71) Applicant: Apple Inc., Cupertino, CA (US)

(72) Inventors: Toufiqul Islam, Santa Clara, CA (US); Sergey Panteleev, Nizhny Novgorod (RU); Debdeep Chatterjee, San Jose, CA (US); Fatemeh Hamidi-Sepehr, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 52 days.

(21) Appl. No.: 16/372,877

(22) Filed: Apr. 2, 2019

(65) Prior Publication Data

US 2019/0253121 A1    Aug. 15, 2019

Related U.S. Application Data

(60) Provisional application No. 62/654,153, filed on Apr. 6, 2018, provisional application No. 62/670,579, filed on May 11, 2018.

(51) Int. Cl.
| | |
|---|---|
| *H04B 7/06* | (2006.01) |
| *H04L 1/00* | (2006.01) |
| *H04W 72/04* | (2009.01) |
| *H04L 5/00* | (2006.01) |
| *H04W 76/27* | (2018.01) |

(52) U.S. Cl.
CPC ......... *H04B 7/0632* (2013.01); *H04B 7/0626* (2013.01); *H04B 7/0636* (2013.01); *H04L 1/0003* (2013.01); *H04L 1/0026* (2013.01); *H04W 72/0413* (2013.01); *H04L 5/0007* (2013.01); *H04W 76/27* (2018.02)

(58) Field of Classification Search
CPC .. H04B 7/0632; H04B 7/0626; H04B 7/0636; H04L 1/0003; H04L 1/0026; H04W 72/0413
See application file for complete search history.

(56) References Cited

U.S. PATENT DOCUMENTS

| | | | |
|---|---|---|---|
| 2016/0135194 A1* | 5/2016 | Kim ................ | H04L 1/0026 370/329 |
| 2017/0188371 A1* | 6/2017 | Kim ................ | H04W 52/243 |
| 2019/0215095 A1* | 7/2019 | Park ................ | H04W 72/042 |
| 2019/0253121 A1* | 8/2019 | Islam ............... | H04B 7/0632 |

(Continued)

*Primary Examiner* — Donald L Mills
(74) *Attorney, Agent, or Firm* — Kowert, Hood, Munyon, Rankin & Goetzel, P.C.

(57) ABSTRACT

User equipment (UE) includes processing circuitry, where to configure the UE for New Radio (NR) communications in an unlicensed spectrum, the processing circuitry is to decode a first configuration message received from a base station, the first configuration message including a channel quality indicator (CQI) table indication identifying a CQI table. A second configuration message is decoded, the second configuration message received separately from the first configuration message and including a modulation and coding scheme (MCS) table indication identifying an MCS table. DCI received via a PDCCH is decoded, the DCI providing a DL grant and an MCS index in the MCS table. DL information received via a PDSCH is decoded using modulation order and target code rate corresponding to the MCS index in the MCS table.

20 Claims, 10 Drawing Sheets

(56) References Cited

U.S. PATENT DOCUMENTS

| | | | |
|---|---|---|---|
| 2019/0260451 A1* | 8/2019 | Sarkis | H04B 7/0486 |
| 2019/0313348 A1* | 10/2019 | MolavianJazi | H04W 52/367 |
| 2019/0349975 A1* | 11/2019 | Nammi | H04L 1/1822 |
| 2020/0052861 A1* | 2/2020 | Li | H04L 5/0007 |
| 2020/0287657 A1* | 9/2020 | Marinier | H04W 72/042 |

* cited by examiner

CONFIGURATION AND DESIGN OF CQI AND MCS TABLES FOR 5G COMMUNICATIONS

PRIORITY CLAIM

This application claims the benefit of priority to the following provisional applications:

U.S. Provisional Patent Application Ser. No. 62/654,153, filed Apr. 6, 2018, and entitled "METHOD OF CONFIGURATION AND DESIGN OF CQI AND MCS TABLES FOR ULTRA-RELIABLE COMMUNICATION;" and U.S. Provisional Patent Application Ser. No. 62/670,579, filed May 11, 2018, and entitled "CONFIGURATION AND DESIGN OF CQI AND MCS TABLES FOR ULTRA-RELIABLE COMMUNICATION." Each of these provisional patent applications is incorporated herein by reference in its entirety.

TECHNICAL FIELD

Aspects pertain to wireless communications. Some aspects relate to wireless networks including 3GPP (Third Generation Partnership Project) networks, 3GPP LTE (Long Term Evolution) networks, 3GPP LTE-A (LTE Advanced) networks, and fifth-generation (5G) networks including 5G new radio (NR) (or 5G-NR) networks and 5G-LTE networks. Other aspects are directed to systems and methods for configuration and design of channel quality information (CQI) and modulation and coding scheme (MCS) tables for 5G communications, including flexible slot format indication (SFI) for 5G-NR communication systems, including ultra-reliable communications.

BACKGROUND

Mobile communications have evolved significantly from early voice systems to today's highly sophisticated integrated communication platform. With the increase in different types of devices communicating with various network devices, usage of 3GPP LTE systems has increased. The penetration of mobile devices (user equipment or UEs) in modem society has continued to drive demand for a wide variety of networked devices in a number of disparate environments. Fifth generation (5G) wireless systems are forthcoming and are expected to enable even greater speed, connectivity, and usability. Next generation 5G networks (or NR networks) are expected to increase throughput, coverage, and robustness and reduce latency and operational and capital expenditures. 5G-NR networks will continue to evolve based on 3GPP LTE-Advanced with additional potential new radio access technologies (RATs) to enrich people's lives with seamless wireless connectivity solutions delivering fast, rich content and services. As current cellular network frequency is saturated, higher frequencies, such as millimeter wave (mmWave) frequency, can be beneficial due to their high bandwidth.

Potential LTE operation in the unlicensed spectrum includes (and is not limited to) the LTE operation in the unlicensed spectrum via dual connectivity (DC), or DC-based LAA, and the standalone LTE system in the unlicensed spectrum, according to which LTE-based technology solely operates in unlicensed spectrum without requiring an "anchor" in the licensed spectrum, called MulteFire. MulteFire combines the performance benefits of LTE technology with the simplicity of Wi-Fi-like deployments.

Further enhanced operation of LTE systems in the licensed as well as unlicensed spectrum is expected in future releases and 5G systems. Such enhanced operations can include techniques to configure and design CQI and MCS tables for 5G communications, including ultra-reliable communications.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various aspects discussed in the present document.

DETAILED DESCRIPTION

The following description and the drawings sufficiently illustrate aspects to enable those skilled in the art to practice them. Other aspects may incorporate structural, logical, electrical, process, and other changes. Portions and features of some aspects may be included in, or substituted for, those of other aspects. Aspects set forth in the claims encompass all available equivalents of those claims.

Figure 1A:
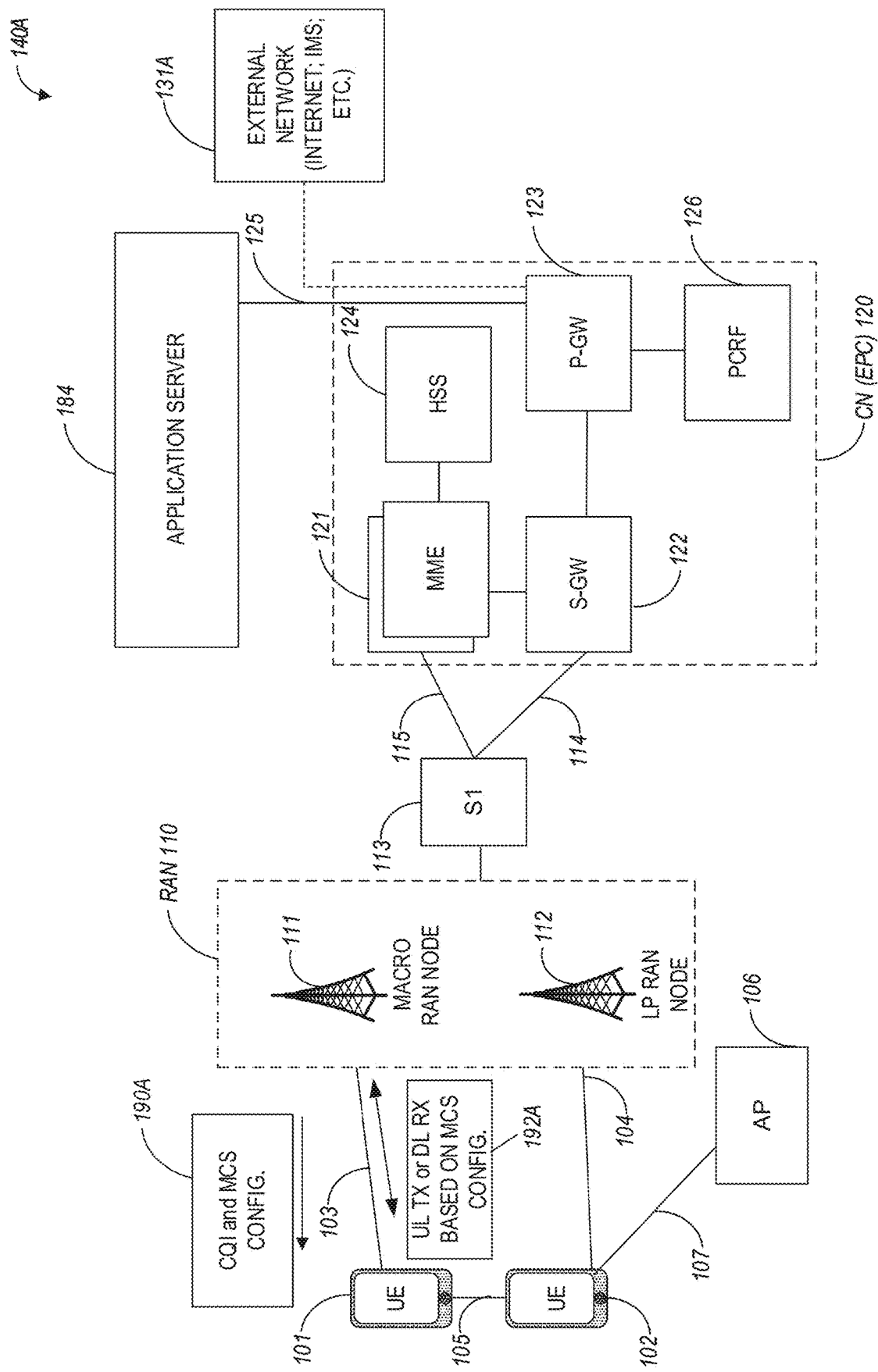
FIG. 1A illustrates an architecture of a network, in accordance with some aspects.

FIG. 1A illustrates an architecture of a network in accordance with some aspects. The network 140A is shown to include user equipment (UE) 101 and UE 102. The UEs 101 and 102 are illustrated as smartphones (e.g., handheld touch-screen mobile computing devices connectable to one or more cellular networks) but may also include any mobile or non-mobile computing device, such as Personal Data Assistants (PDAs), pagers, laptop computers, desktop computers, wireless handsets, drones, or any other computing device including a wired and/or wireless communications interface. The UEs 101 and 102 can be collectively referred to herein as UE 101, and UE 101 can be used to perform one or more of the techniques disclosed herein.

Any of the radio links described herein (e.g., as used in the network 140A or any other illustrated network) may operate according to any exemplary radio communication technology and/or standard.

LTE and LTE-Advanced are standards for wireless communications of high-speed data for UE such as mobile telephones. In LTE-Advanced and various wireless systems, carrier aggregation is a technology according to which multiple carrier signals operating on different frequencies may be used to carry communications for a single UE, thus increasing the bandwidth available to a single device. In some aspects, carrier aggregation may be used where one or more component carriers operate on unlicensed frequencies.

There are emerging interests in the operation of LTE systems in the unlicensed spectrum. As a result, an important enhancement for LTE in 3GPP Release 13 has been to enable its operation in the unlicensed spectrum via Licensed-Assisted Access (LAA), which expands the system bandwidth by utilizing the flexible carrier aggregation (CA) framework introduced by the LTE-Advanced system. Rel-13 LAA system focuses on the design of downlink operation on unlicensed spectrum via CA, while Rel-14 enhanced LAA (eLAA) system focuses on the design of uplink operation on unlicensed spectrum via CA.

Aspects described herein can be used in the context of any spectrum management scheme including, for example, dedicated licensed spectrum, unlicensed spectrum, (licensed) shared spectrum (such as Licensed Shared Access (LSA) in 2.3-2.4 GHz, 3.4-3.6 GHz, 3.6-3.8 GHz, and further frequencies and Spectrum Access System (SAS) in 3.55-3.7 GHz and further frequencies). Applicable exemplary spectrum bands include IMT (International Mobile Telecommunications) spectrum (including 450-470 MHz, 790-960 MHz, 1710-2025 MHz, 2110-2200 MHz, 2300-2400 MHz, 2500-2690 MHz, 698-790 MHz, 610-790 MHz, 3400-3600 MHz, to name a few), IMT-advanced spectrum, IMT-2020 spectrum (expected to include 3600-3800 MHz, 3.5 GHz bands, 700 MHz bands, bands within the 24.25-86 GHz range, for example), spectrum made available under the Federal Communications Commission's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 71-76 GHz, 81-86 GHz and 92-94 GHz, etc), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz), WiGig Band 3 (61.56-63.72 GHz), and WiGig Band 4 (63.72-65.88 GHz); the 70.2 GHz-71 GHz band; any band between 65.88 GHz and 71 GHz; bands currently allocated to automotive radar applications such as 76-81 GHz; and future bands including 94-300 GHz and above. Furthermore, the scheme can be used on a secondary basis on bands such as the TV White Space bands (typically below 790 MHz) wherein particular the 400 MHz and 700 MHz bands can be employed. Besides cellular applications, specific applications for vertical markets may be addressed, such as PMSE (Program Making and Special Events), medical, health, surgery, automotive, low-latency, drones, and the like.

Aspects described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

In some aspects, any of the UEs 101 and 102 can comprise an Internet-of-Things (IoT) UE or a Cellular IoT (CIoT) UE, which can comprise a network access layer designed for low-power IoT applications utilizing short-lived UE connections. In some aspects, any of the UEs 101 and 102 can include a narrowband (NB) IoT UE (e.g., such as an enhanced NB-IoT (eNB-IoT) UE and Further Enhanced (FeNB-IoT) UE). An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

In some aspects, NB-IoT devices can be configured to operate in a single physical resource block (PRB) and may be instructed to retune two different PRBs within the system bandwidth. In some aspects, an eNB-IoT UE can be configured to acquire system information in one PRB, and then it can retune to a different PRB to receive or transmit data.

In some aspects, any of the UEs 101 and 102 can include enhanced MTC (eMTC) UEs or further enhanced MTC (FeMTC) UEs.

The UEs 101 and 102 may be configured to connect, e.g., communicatively couple, with a radio access network (RAN) 110. The RAN 110 may be, for example, an Evolved Universal Mobile Telecommunications System (UMTS) Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol a Universal Mobile Telecommunications System (UMTS) protocol, a 3GPP Long Term Evolution (LTE) protocol, a fifth generation (5G) protocol, a New Radio (NR) protocol, and the like.

In some aspects, the network 140A can include a core network (CN) 120. Various aspects of NG RAN and NG Core are discussed herein in reference to, e.g., FIG. 1B, FIG. 1C, FIG. 1D, and FIG. 1E.

In an aspect, the UEs 101 and 102 may further directly exchange communication data via a ProSe interface 105. The ProSe interface 105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), Next Generation NodeBs (gNBs), RAN nodes, and the like, and can comprise ground stations (e.g., terrestrial access points) or satellite stations providing coverage within a geographic area (e.g., a cell). In some aspects, the communication nodes 111 and 112 can be transmission/reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some aspects, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management. In an example, any of the nodes 111 and/or 112 can be a new generation node-B (gNB), an evolved node-B (eNB), or another type of RAN node.

In accordance with some aspects, the UEs 101 and 102 can be configured to communicate using Orthogonal Frequency-Division Multiplexing (OFDM) communication signals with each other or with any of the RAN nodes 111 and 112 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe for sidelink communications), although such aspects are not required. The OFDM signals can comprise a plurality of orthogonal subcarriers.

In some aspects, a downlink resource grid can be used for downlink transmissions from any of the RAN nodes 111 and 112 to the UEs 101 and 102, while uplink transmissions can utilize similar techniques. The grid can be a time-frequency grid, called a resource grid or time-frequency resource grid, which is the physical resource in the downlink in each slot. Such a time-frequency plane representation may be used for OFDM systems, which makes it applicable for radio resource allocation. Each column and each row of the resource grid may correspond to one OFDM symbol and one OFDM subcarrier, respectively. The duration of the resource grid in the time domain may correspond to one slot in a radio frame. The smallest time-frequency unit in a resource grid may be denoted as a resource element. Each resource grid may comprise a number of resource blocks, which describe the mapping of certain physical channels to resource elements. Each resource block may comprise a collection of resource elements; in the frequency domain, this may, in some aspects, represent the smallest quantity of resources that currently can be allocated. There may be several different physical downlink channels that are conveyed using such resource blocks.

The physical downlink shared channel (PDSCH) may carry user data and higher-layer signaling to the UEs 101 and 102. The physical downlink control channel (PDCCH) may carry information about the transport format and resource allocations related to the PDSCH channel, among other things. It may also inform the UEs 101 and 102 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 111 and 112 based on channel quality information fed back from any of the UEs 101 and 102. The downlink resource assignment information may be sent on the PDCCH used for (e.g., assigned to) each of the UEs 101 and 102.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some aspects may use concepts for resource allocation for control channel information that are an extension of the above-described concepts. For example, some aspects may utilize an enhanced physical downlink control channel (EPDCCH) that uses PDSCH resources for control information transmission. The EPDCCH may be transmitted using one or more enhanced control channel elements (ECCEs). Similar to above, each ECCE may correspond to nine sets of four physical resource elements known as an enhanced resource element groups (EREGs). An ECCE may have other numbers of EREGs according to some arrangements.

The RAN 110 is shown to be communicatively coupled to a core network (CN) 120 via an S1 interface 113. In aspects, the CN 120 may be an evolved packet core (EPC) network, a NextGen Packet Core (NPC) network, or some other type of CN (e.g., as illustrated in reference to FIGS. 1B-Ii). In this aspect, the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include a lawful intercept, charging, and some policy enforcement.

The P-GW 123 may terminate an SGi interface toward a PDN. The P-GW 123 may route data packets between the EPC network 120 and external networks such as a network including the application server 184 (alternatively referred to as application function (AF)) via an Internet Protocol (IP) interface 125. The P-GW 123 can also communicate data to other external networks 131A, which can include the Internet, IP multimedia subsystem (IPS) network, and other networks. Generally, the application server 184 may be an element offering applications that use IP bearer resources with the core network (e.g., UMTS Packet Services (PS) domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some aspects, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 184 via the P-GW 123. The application server 184 may signal the PCRF 126 to indicate a new service flow and select the appropriate Quality of Service (QoS) and charging parameters. The PCRF 126 may provision this rule into a Policy and Charging Enforcement Function (PCEF) (not shown) with the appropriate traffic flow template (TFT) and QoS class of identifier (QCI), which commences the QoS and charging as specified by the application server 184.

In an example, any of the nodes 111 or 112 can be configured to communicate to the UEs 101, 102 (e.g., dynamically) an antenna panel selection and a receive (Rx) beam selection that can be used by the UE for data reception on a physical downlink shared channel (PDSCH) as well as for channel state information reference signal (CSI-RS) measurements and channel state information (CSI) calculation.

In an example, any of the nodes 111 or 112 can be configured to communicate to the UEs 101, 102 (e.g., dynamically) an antenna panel selection and a transmit (Tx) beam selection that can be used by the UE for data transmission on a physical uplink shared channel (PUSCH) as well as for sounding reference signal (SRS) transmission.

In some aspects, the communication network 140A can be an IoT network. One of the current enablers of IoT is the narrowband-IoT (NB-IoT). NB-IoT has objectives such as coverage extension, UE complexity reduction, long battery lifetime, and backward compatibility with the LTE network. In addition, NB-IoT aims to offer deployment flexibility allowing an operator to introduce NB-IoT using a small portion of its existing available spectrum, and operate in one of the following three modalities: (a) standalone deployment (the network operates in re-farmed GSM spectrum); (b) in-band deployment (the network operates within the LTE channel): and (c) guard-band deployment (the network operates in the guard band of legacy LTE channels). In some aspects, such as with further enhanced NB-IoT (FeNB-IoT), support for NB-IoT in small cells can be provided (e.g., in microcell, picocell or femtocell deployments). One of the challenges NB-IoT systems face for small cell support is the UL/DL link imbalance, where for small cells the base stations have lower power available compared to macrocells, and, consequently, the DL coverage can be affected and/or reduced. In addition, some NB-IoT UEs can be configured to transmit at maximum power if repetitions are used for UL transmission. This may result in large inter-cell interference in dense small cell deployments.

In some aspects, the UE 101 can support connectivity to a 5G core network (SGCN) (or 5G access network or 5G-AN) and can be configured to operate with Early Data Transmission (EDT) in a communication architecture that supports one or more of Machine Type Communications (MTC), enhanced MTC (eMTC), further enhanced MTC (feMTC), even further enhanced MTC (efeMTC), and narrowband Internet-of-Things (NB-IoT) communications. When operating with EDT, a physical random access channel (PRACH) procedure message 3 (MSG3) can be used to carry the short uplink (UL) data and PRACH procedure message 4 (MSG4) can be used to carry short downlink (DL) data (if any is available). When a UE wants to make a new RRC connection, it first transmits one or more preambles, which can be referred to as PRACH procedure message 1 (MSG1). The MSG4 can also indicate UE to immediately go to IDLE mode. For this purpose, the transport block size (TBS) scheduled by the UL grant received for the MSG3 to transmit UL data for EDT needs to be larger than the TBS scheduled by the legacy grant. In some aspects, the UE can indicate its intention of using the early data transmission via MSG1 using a separate PRACH resource partition. From MSG1, eNB knows that it has to provide a grant scheduling TBS values that may differ from legacy TBS for MSG3 in the random-access response (RAR or MSG2) so that the UE can transmit UL data in MSG3 for EDT. However, the eNB may not exactly know to what would be the size of UL data the UE wants to transmit for EDT and how large a UL grant for MSG3 would be needed, though a minimum and a maximum TBS for the UL grant could be defined. The following two scenarios may occur: (a) The UL grant provided in RAR is larger than the UL data plus header. In this case, layer 1 needs to add one or more padding bits in the remaining grant. However, transmitting a large number of padding bits (or useless bits) is not power efficient especially in deep coverage where a larger number of repetitions of transmission is required. (b) Similarly, when the UL grant provided in RAR is large but falls short to accommodate the UL data for the EDT, the UE may have to send only the legacy RRC message to fallback to legacy RRC connection. In this case, UE may again need to transmit a number of padding bits, which can be inefficient.

As used herein, the term "PRACH procedure" can be used interchangeably with the term "Random Access procedure" or "RA procedure".

In some aspects and as described hereinbelow in connection with FIG. 2-FIG. 5, CQI and MCS tables can be configured in connection with 5G operations within the architecture 140A. More specifically, CQI table configuration information and MSC table configuration information (collectively referenced as 190A) can be separately communicated to the UE 101 for separate configuration of CQI index reporting and MCS index selection for purposes of encoding uplink (UL) transmissions or decoding downlink (DL) receptions (collectively referenced as 192A).

Figure 1B:
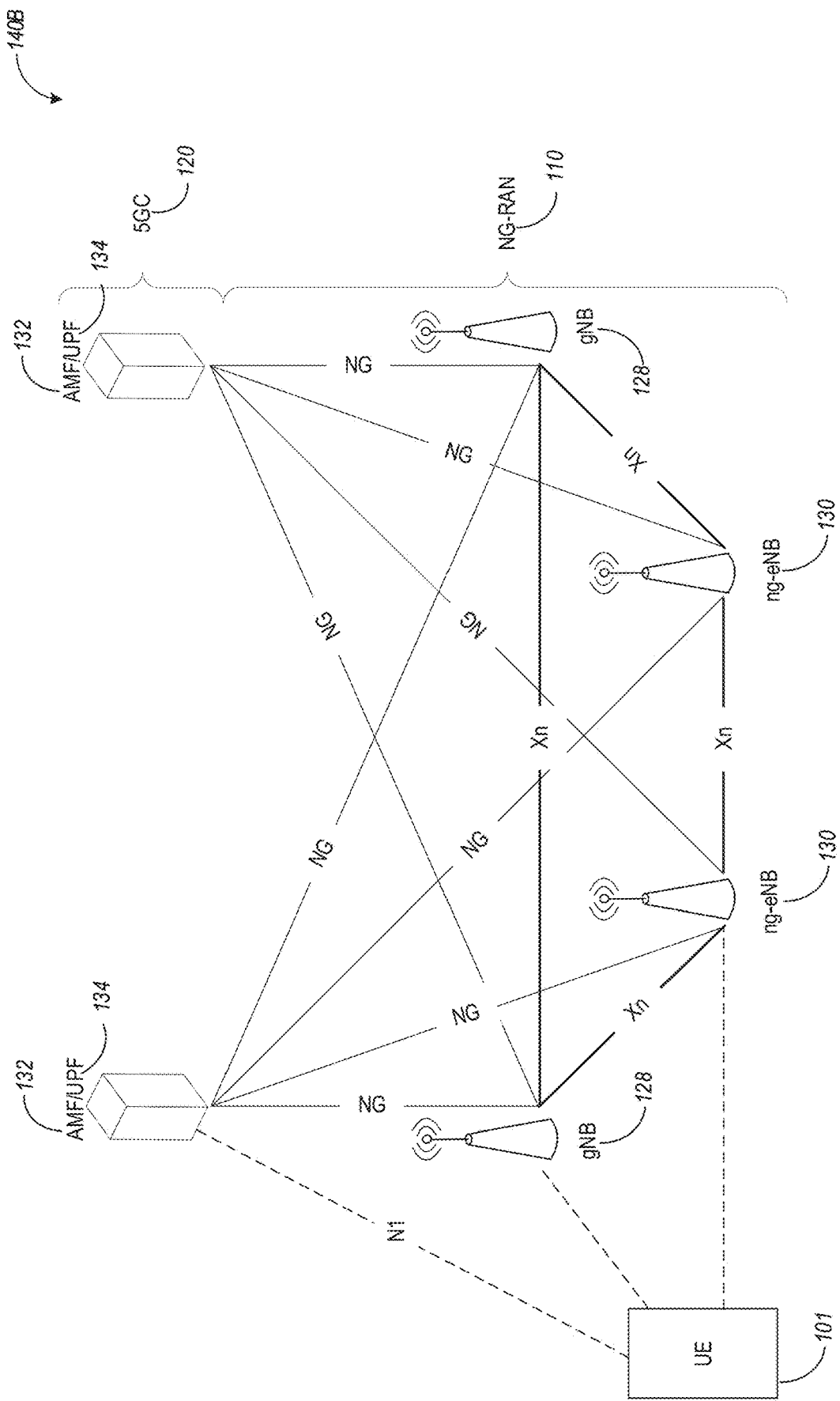
FIG. 1B is a simplified diagram of an overall next generation (NG) system architecture, in accordance with some aspects.

FIG. 1B is a simplified diagram of a next generation (NG) system architecture 140B in accordance with some aspects. Referring to FIG. 1B, the NG system architecture 140B includes RAN 110 and a 5G network core (5GC) 120. The NG-RAN 110 can include a plurality of nodes, such as gNBs 128 and NG-eNBs 130.

The core network 120 (e.g., a 5G core network or 5GC) can include an access and mobility function (AMF) 132 and/or a user plane function (UPF) 134. The AMF 132 and the UPF 134 can be communicatively coupled to the gNBs 128 and the NG-eNBs 130 via NG interfaces. More specifically, in some aspects, the gNBs 128 and the NG-eNBs 130 can be connected to the AMF 132 by NG-C interfaces, and to the UPF 134 by NG-U interfaces. The gNBs 128 and the NG-eNBs 130 can be coupled to each other via Xn interfaces.

In some aspects, a gNB 128 can include a node providing new radio (NR) user plane and control plane protocol termination towards the UE and is connected via the NG interface to the 5GC 120. In some aspects, an NG-eNB 130 can include a node providing evolved universal terrestrial radio access (E-UTRA) user plane and control plane protocol terminations towards the UE and is connected via the NG interface to the 5GC 120.

In some aspects, the NG system architecture 140B can use reference points between various nodes as provided by 3GPP Technical Specification (TS) 23.501 (e.g., V15.4.0, 2018 December).

In some aspects, each of the gNBs 128 and the NG-eNBs 130 can be implemented as a base station, a mobile edge server, a small cell, a home eNB, and so forth.

In some aspects, node 128 can be a master node (MN) and node 130 can be a secondary node (SN) in a 5G architecture. The MN 128 can be connected to the AMF 132 via an NG-C interface and to the SN 128 via an XN-C interface. The MN 128 can be connected to the UPF 134 via an NG-U interface and to the SN 128 via an XN-U interface.

Figure 1C:
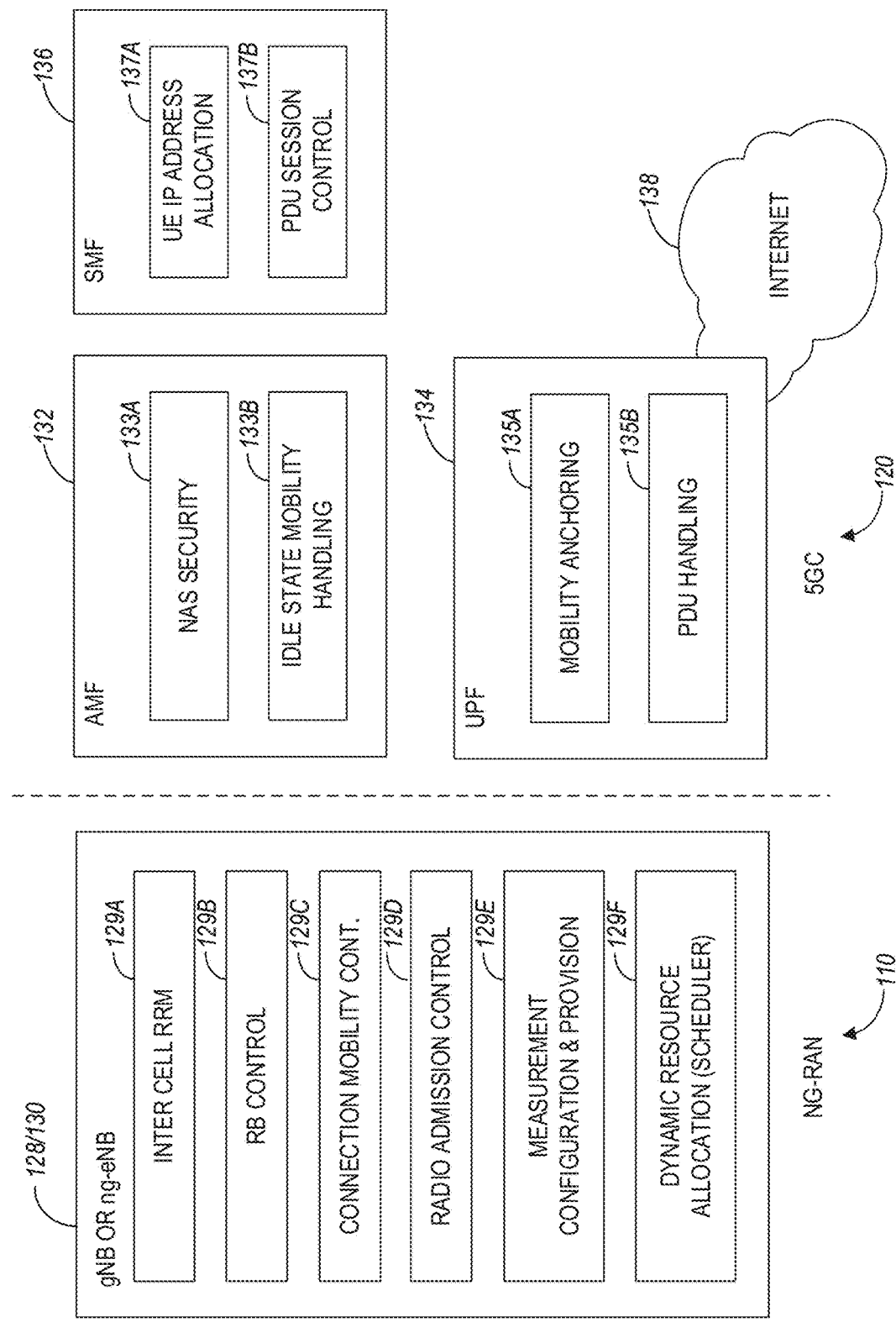
FIG. 1C illustrates a functional split between next generation radio access network (NG-RAN) and the 5G Core network (5GC), in accordance with some aspects.

FIG. 1C illustrates a functional split between NG-RAN and the 5G Core (5GC) in accordance with some aspects. Referring to FIG. 1C, there is illustrated a more detailed diagram of the functionalities that can be performed by the gNBs 128 and the NG-eNBs 130 within the NG-RAN 110, as well as the AMF 132, the UPF 134, and the SMF 136 within the 5GC 120. In some aspects, the 5GC 120 can provide access to the Internet 138 to one or more devices via the NG-RAN 110.

In some aspects, the gNBs 128 and the NG-eNBs 130 can be configured to host the following functions: functions for Radio Resource Management (e.g., inter-cell radio resource management 129A, radio bearer control 129B, connection mobility control 129C, radio admission control 129D, dynamic allocation of resources to UEs in both uplink and downlink (scheduling) 129F); IP header compression, encryption and integrity protection of data: selection of an AMF at UE attachment when no routing to an AMF can be determined from the information provided by the UE; routing of User Plane data towards UPF(s): routing of Control Plane information towards AMF; connection setup and release; scheduling and transmission of paging messages (originated from the AMF); scheduling and transmission of system broadcast information (originated from the AMF or Operation and Maintenance): measurement and measurement reporting configuration for mobility and scheduling 129E; transport level packet marking in the uplink: session management; support of network slicing; QoS flow management and mapping to data radio bearers; support of UEs in RRC_INACTIVE state; distribution function for non-access stratum (NAS) messages; radio access network sharing; dual connectivity; and tight interworking between NR and E-UTRA, to name a few.

In some aspects, the AMF 132 can be configured to host the following functions, for example: NAS signaling termination; NAS signaling security 133A: access stratum (AS) security control; inter-core network (CN) node signaling for mobility between 3GPP access networks; idle state/mode mobility handling 133B, including mobile device, such as a UE reachability (e.g., control and execution of paging retransmission): registration area management: support of intra-system and inter-system mobility; access authentication: access authorization including check of roaming rights; mobility management control (subscription and policies); support of network slicing; and/or SMF selection, among other functions.

The UPF 134 can be configured to host the following functions, for example: mobility anchoring 135A (e.g., anchor point for Intra-/Inter-RAT mobility): packet data unit (PDU) handling 135B (e.g., external PDU session point of interconnect to data network); packet routing and forwarding; packet inspection and user plane part of policy rule enforcement: traffic usage reporting: uplink classifier to support routing traffic flows to a data network; branching point to support multi-homed PDU session: QoS handling for user plane, e.g., packet filtering, gating, UL/DL rate enforcement: uplink traffic verification (SDF to QoS flow mapping); and/or downlink packet buffering and downlink data notification triggering, among other functions.

The Session Management function (SMF) 136 can be configured to host the following functions, for example: session management: UE IP address allocation and management 137A; selection and control of user plane function (UPF); PDU session control 137B, including configuring traffic steering at UPF 134 to route traffic to proper destination; control part of policy enforcement and QoS; and/or downlink data notification, among other functions.

Figure 1D:
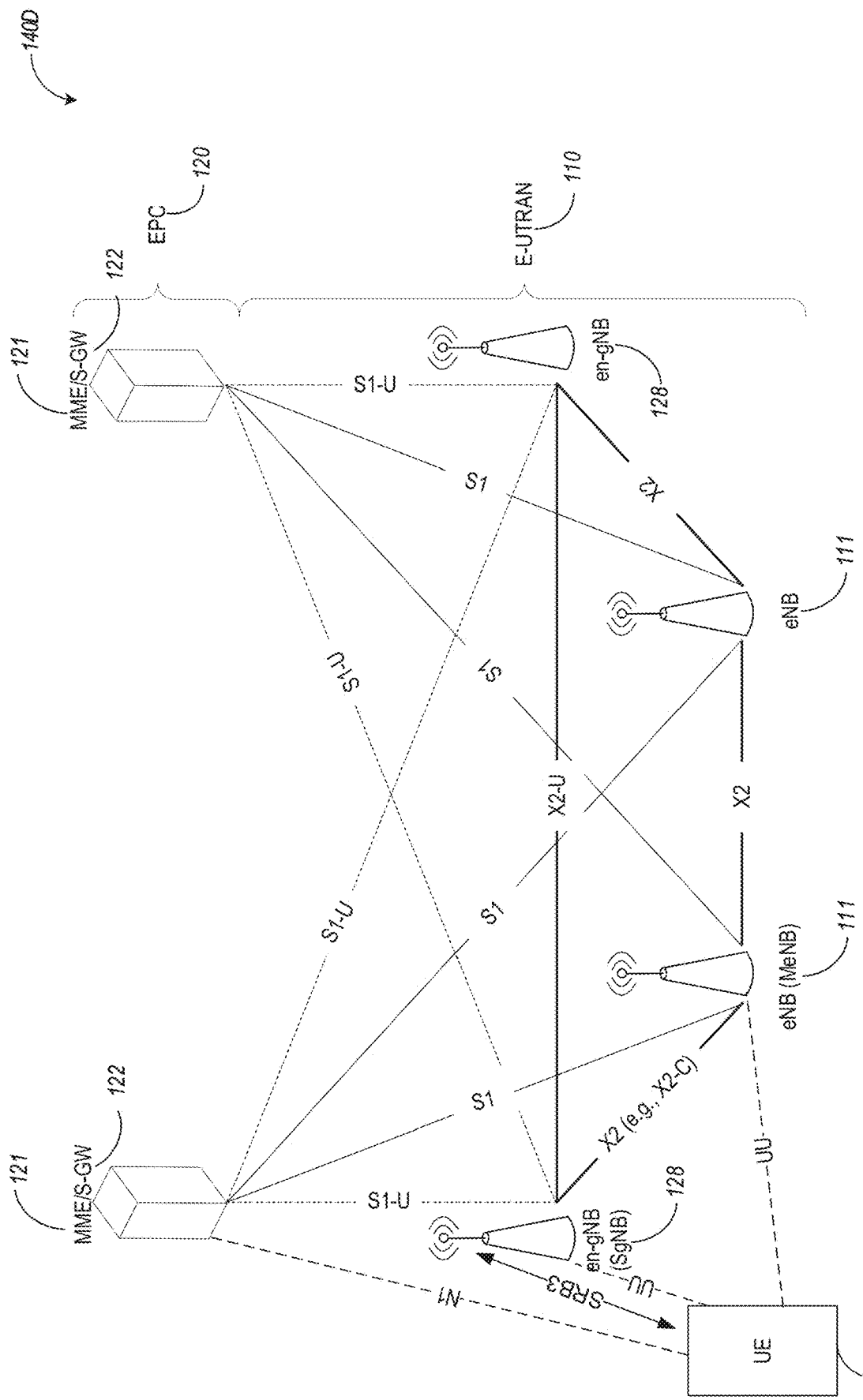
FIG. 1D illustrates an example Evolved Universal Terrestrial Radio Access (E-UTRA) New Radio Dual Connectivity (EN-DC) architecture, in accordance with some aspects.

FIG. 1D illustrates an example Evolved Universal Terrestrial Radio Access (E-UTRA) New Radio Dual Connectivity (EN-DC) architecture, in accordance with some aspects. Referring to FIG. 1D, the EN-DC architecture 140D includes radio access network (or E-TRA network, or E-TRAN) 110 and EPC 120. The EPC 120 can include MMEs 121 and S-GWs 122. The E-UTRAN 110 can include nodes 111 (e.g., eNBs) as well as Evolved Universal Terrestrial Radio Access New Radio (EN) next generation evolved Node-Bs (en-gNBs) 128.

In some aspects, en-gNBs 128 can be configured to provide NR user plane and control plane protocol terminations towards the UE 102 and acting as Secondary Nodes (or SgNBs) in the EN-DC communication architecture 140D. The eNBs 111 can be configured as master nodes (or MeNBs) and the eNBs 128 can be configured as secondary nodes (or SgNBs) in the EN-DC communication architecture 140D. As illustrated in FIG. 1D, the eNBs 111 are connected to the EPC 120 via the S1 interface and to the EN-gNBs 128 via the X2 interface. The EN-gNBs (or SgNBs) 128 may be connected to the EPC 120 via the S I-U interface, and to other EN-gNBs via the X2-U interface. The SgNB 128 can communicate with the UE 102 via a UU interface (e.g., using signaling radio bearer type 3, or SRB3 communications as illustrated in FIG. 1D), and with the MeNB 111 via an X2 interface (e.g., X2-C interface). The MeNB 111 can communicate with the UE 102 via a UU interface.

Even though FIG. 1D is described in connection with EN-DC communication environment, other types of dual connectivity communication architectures (e.g., when the UE 102 is connected to a master node and a secondary node) can also use the techniques disclosed herein.

In some aspects, the MeNB 111 can be connected to the MME 121 via S1-MME interface and to the SgNB 128 via an X2-C interface. In some aspects, the MeNB 111 can be connected to the SGW 122 via S1-U interface and to the SgNB 128 via an X2-U interface. In some aspects associated with dual connectivity (DC) and/or MultiRate-DC (MR-DC), the Master eNB (MeNB) can offload user plane traffic to the Secondary gNB (SgNB) via split bearer or SCG (Secondary Cell Group) split bearer.

Figure 1E:
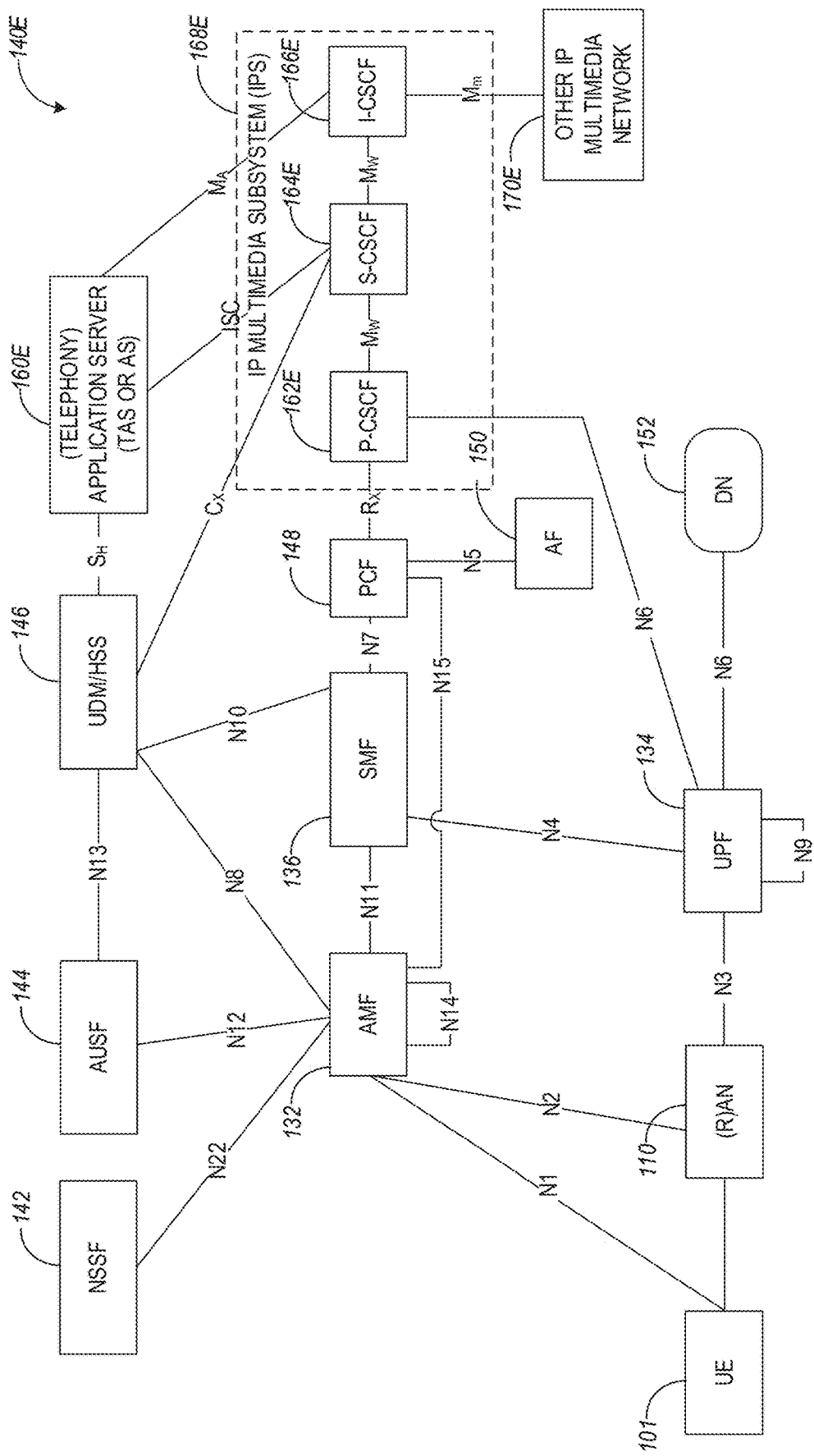
FIG. 1E illustrates a non-roaming 5G system architecture in accordance with some aspects.

FIG. 1E illustrates a non-roaming 5G system architecture in accordance with some aspects. Referring to FIG. 1E, there is illustrated a 5G system architecture 140E in a reference point representation. More specifically, UE 102 can be in communication with RAN 110 as well as one or more other 5G core (5GC) network entities. The 5G system architecture 140E includes a plurality of network functions (NFs), such as access and mobility management function (AMF) 132, session management function (SMF) 136, policy control function (PCF) 148, application function (AF) 150, user plane function (UPF) 134, network slice selection function (NSSF) 142, authentication server function (AUSF) 144, and unified data management (UDM)/home subscriber server (HSS) 146. The UPF 134 can provide a connection to a data network (DN) 152, which can include, for example, operator services. Internet access, or third-party services. The AMF 132 can be used to manage access control and mobility and can also include network slice selection functionality. The SMF 136 can be configured to set up and manage various sessions according to a network policy. The UPF 134 can be deployed in one or more configurations according to a desired service type. The PCF 148 can be configured to provide a policy framework using network slicing, mobility management, and roaming (similar to PCRF in a 4G communication system). The UDM can be configured to store subscriber profiles and data (similar to an HSS in a 4G communication system).

In some aspects, the 5G system architecture 140E includes an IP multimedia subsystem (IMS) 168E as well as a plurality of IP multimedia core network subsystem entities, such as call session control functions (CSCFs). More specifically, the IMS 168E includes a CSCF, which can act as a proxy CSCF (P-CSCF) 162E, a serving CSCF (S-CSCF) 164E, an emergency CSCF (E-CSCF) (not illustrated in FIG. 1E), or interrogating CSCF (I-CSCF) 166E. The P-CSCF 162E can be configured to be the first contact point for the UE 102 within the IM subsystem (IMS) 168E. The S-CSCF 164E can be configured to handle the session states in the network, and the E-CSCF can be configured to handle certain aspects of emergency sessions such as routing an emergency request to the correct emergency center or PSAP. The I-CSCF 166E can be configured to function as the contact point within an operator's network for all IMS connections destined to a subscriber of that network operator, or a roaming subscriber currently located within that network operator's service area. In some aspects, the I-CSCF 166E can be connected to another IP multimedia network 170E, e.g. an IMS operated by a different network operator.

In some aspects, the UDM/HSS 146 can be coupled to an application server 160E, which can include a telephony application server (TAS) or another application server (AS). The AS 160E can be coupled to the IMS 168E via the S-CSCF 164E or the I-CSCF 166E. In some aspects, the 5G system architecture 140E can use unified access barring mechanism using one or more of the techniques described herein, which access barring mechanism can be applied for all RRC states of the UE 102, such as RRC_IDLE, RRC_CONNECTED, and RRC_INACTIVE states.

In some aspects, the 5G system architecture 140E can be configured to use 5G access control mechanism techniques described herein, based on access categories that can be categorized by a minimum default set of access categories, which are common across all networks. This functionality can allow the public land mobile network PLMN, such as a visited PLMN (VPLMN) to protect the network against different types of registration attempts, enable acceptable service for the roaming subscriber and enable the VPLMN to control access attempts aiming at receiving certain basic services. It also provides more options and flexibility to individual operators by providing a set of access categories, which can be configured and used in operator-specific ways.

A reference point representation shows that interaction can exist between corresponding NF services. For example, FIG. 1E illustrates the following reference points: N1 (between the UE 102 and the AMF 132), N2 (between the RAN 110 and the AMF 132), N3 (between the RAN 110 and the UPF 134), N4 (between the SMF 136 and the UPF 134), N5 (between the PCF 148 and the AF 150, not shown), N6 (between the UPF 134 and the DN 152), N7 (between the SMF 136 and the PCF 148, not shown), N8 (between the UDM 146 and the AMF 132, not shown), N9 (between two UPFs 134, not shown), N10 (between the UDM 146 and the SMF 136, not shown), N11 (between the AMF 132 and the SMF 136, not shown), N12 (between the AUSF 144 and the AMF 132, not shown). N13 (between the AUSF 144 and the UDM 146, not shown), N14 (between two AMFs 132, not shown), N15 (between the PCF 148 and the AMF 132 in case of a non-roaming scenario, or between the PCF 148 and a visited network and AMF 132 in case of a roaming scenario, not shown), N16 (between two SMFs, not shown), and N22 (between AMF 132 and NSSF 142, not shown). Other reference point representations not shown in FIG. 1E can also be used.

In legacy LTE systems, one block error rate (BLER) target (i.e., 10%) and a corresponding 4-bit channel quality indicator (CQI) table are used for reporting a spectral efficiency (SE) point (i.e., a candidate MCS) by the UE based on the observed/measured channel conditions. A 5-bit MCS table is obtained from the CQI table with additional choices for spectral efficiency points (i.e., modulation and coding rates) which the base station uses for choosing an MCS for a subsequent scheduled transmission so that BLER target can be met. For enhanced mobile broadband (eMBB) services for which very high residual reliability (BLER<$10^{-3}$) is not required within a short latency, this approach is sufficient. However, for ultra-reliable low latency communications (URLLC), operating at 10% BLER target only for one transmission may not ensure desired end-to-end reliability (e.g., BLER in the order of $10^{-1}$) within a short time period, e.g., 1 ms. In particular, URLLC services assume a very diverse range of reliability and latency requirements, therefore, at least some flexibility in selecting BLER target is desirable. Furthermore, availability of CQI measurements for two BLER targets enables advanced adaptive retransmission schemes which use more spectrum efficient parameters for an initial transmission(s) and more robust (less spectrum efficient) for retransmissions. Additionally, measurements on two target BLERs provide the possibility for rather accurate extrapolation/interpolation to any other target BLER.

In some aspects, one of multiple BLER target is configured to the UE by higher layer signaling, e.g., RRC signaling. The CQI table may be based on one channel code or a mix of channel codes, such as some entries are for LDPC, some entries are for Polar. An MCS table can be based on the CQI table for a configured BLER target. LTE Legacy MCS table does not use the minimum SE point of CQI table. LTE Legacy MCS table reserves few entries in the table for use during re-transmission where only modulation order is indicated. However, associating an MCS table with a BLER target that is configured and/or a CQI table reduces flexibility in terms of resource allocation. Not exploiting the minimum SE point of a CQI table and/or the entries otherwise used for reserved entries for indication modulation may not be optimal for URLLC operation, where more flexibility in terms of MCS selection is desirable for resource allocation for meeting an end-to-end reliability target.

Techniques disclosed herein can be used for configuring multiple BLER targets, CQI and MCS tables for a UE, as well as design CQI and MCS tables.

UE receives configuration messages for BLER target and/or CQI table and/or MCS table, where the configuration messages can be independent for DL and UL. CQI and MCS tables may have even or uneven operating SNR step sizes. MCS table derived from a CQI table based on configured BLER target A can be used for transmission for a BLER target B, where A and B can be different. Examples of CQI and MCS tables are also provided. Decoupling an MCS table configuration from a CQI table/BLER target configuration allows for more flexible resource allocation and operation at a wide range of SE points, e.g., the base station may operate at a different BLER target than the BLER target used for CQI reporting. In some aspects, MCS tables for UL and DL can be separately configured. In some aspects, a proposed MCS table can use the minimum SE point of the CQI table, and optionally can use all available indices to indicate MCS, i.e., there may not be any reserved entries. This provides more flexibility in terms of resource allocation for a target operating BLER point.

Techniques are disclosed herein in two sections. The first section focuses on configurability and signaling of the BLER targets, CQI and MCS tables. The second section outlines the CQI and MCS table design and embodiment examples.

In some aspects, CQI and MCS tables may have M and L entries respectively, where in one example M and L are a power of two. M can be larger, equal or smaller than L. Unless otherwise specified, the techniques disclosed herein apply to both DL and UL. In particular, the proposed MCS tables can be used for both DL and UL CP-OFDM transmissions. A UL transmission includes both with and without a grant. Note that a UL transmission without a DCI-based grant is also referred to as UL transmission with the configured grant.

Configuration and Signaling for CQI/MCS Tables (A) Examples for Configuring MCS Table Separately from BLER Target and CQI Table In a first aspect, a first UE-specific configuration message is signaled to the UE indicating a BLER target for CQI reporting and associated CQI table to use for CSI feedback. There can be N (N being a positive integer) BLER targets for CQI reporting and corresponding CQI tables, where the candidate BLER targets and CQI tables can be UE specific or specified in standards. A second UE-specific configuration message, independent of the first configuration message, is signaled to the UE to indicate which MCS table, from supported candidate MCS tables, can be assumed by the UE when base station schedules a subsequent DL and UL transmission.

In a second aspect, a first UE-specific configuration message is signaled to the UE indicating a BLER target and associated CQI table to use for CSI feedback. There can be N (N being a positive integer) BLER targets for CQI reporting and corresponding CQI tables, where the candidate BLER targets and CQI tables can be UE specific or specified in standards. A second UE-specific configuration message, independent of the first configuration message, is signaled to the UE to indicate which MCS table, from supported candidate MCS tables, can be assumed by the UE when base station schedules a subsequent DL transmission. (e.g., see FIG. 2 for signaling steps).

In a third aspect, a first UE-specific configuration message is signaled to the UE indicating a BLER target and associated CQI table to use for CSI feedback. There can be N (N being a positive integer) BLER targets for CQI reporting and corresponding CQI tables, where the candidate BLER targets and CQI tables can be UE specific or specified in standards. A second UE-specific configuration message, independent of the first configuration message, is signaled to the UE to indicate which MCS table, from supported candidate MCS tables, can be assumed by the UE when base station schedules a subsequent UL transmission.

In a fourth aspect, a first UE-specific configuration message is signaled to the UE indicating (e.g., implicitly) a BLER target and associated CQI table to use for CSI feedback. There can be N (N being a positive integer) BLER targets for CQI reporting and corresponding CQI tables, where the candidate BLER targets and CQI tables can be UE specific or specified in to standards. A second UE-specific configuration message, independent of the first configuration message, is signaled to the UE to indicate which MCS table, from supported candidate MCS tables, can be assumed by the UE when base station schedules a subsequent DL transmission. A third configuration message, independent of the first and second configuration message, is signaled to the UE to indicate which MCS table, from supported candidate MCS tables, can be assumed by the UE when base station schedules a subsequent UL transmission. The candidate MCS tables can be same or different for DL and UL transmissions In some aspects, one or more of the configuration messages can be transmitted to the UE separately or together in one composite signaling.

In some aspects, configuration messages can be transmitted to the UE by higher layer signaling, such as RRC signaling. One or more of the configuration messages mentioned above can be appended to another configuration message which provides other configuration information such as CSI resource setting, bandwidth part, PDSCH or PUSCH configuration setting, etc. For example, an MCS table for use can be indicated (e.g., by an mcs-Table parameter) as part of the PDSCH or PUSCH configuration information element as part of RRC configuration such as listed below where an entry is added in the PDSCH information element, as follows:

---
-- Indicates which MCS table the UE shall use for PDSCH. Corresponds to L1 parameter 'MCS-Table-PDSCH'.
    mcs-Table                ENUMERATED {config1, config2},
--- where config1 and config2 represent the identifier for the chosen MCS table. For example, in config1, MCS table can be legacy MCS table based on 64QAM, where config2 can be new MCS table which may have the highest SE 16 or 64QAM. In another example, the following signaling can be used to indicate an MCS table:

---
-- Indicates which MCS table the UE shall use for PDSCH. Corresponds to L1 parameter 'MCS-Table-PDSCH'.
    mcs-Table        ENUMERATED {qam64, qam256, new config},
--- where qam64 and qam256 indicate legacy MCS table based on highest modulation scheme 64QAM or 256QAM. Parameter "new config" is the identifier for a new MCS table.

In some aspects, if a new MCS table has a maximum 64QAM, then enumeration can be obtained as {(qam64-config1, qam256, qam64-config2}, where qam64-config1 indicate legacy MCS table for 64QAM, and qam64-config2 indicate new MCS table. In another aspect, the new MCS table may have the highest modulation of 16QAM. Then enumeration can be {qam64, qam256, qam16}. Two bits necessary to indicate one from the three supported configuration. If the field is absent, the UE may assume 64QAM based legacy MCS table. Note that other order of enumeration is also possible, such as {new config, qam64, qam256} or {qam64, new config, qam256}.

In some aspects, the indication of which MCS table to be used is RRC configured as part of the PDSCH configuration set (which lies inside the DL BWP configuration). The RRC configuration can be on a per-UE and per-bandwidth part (BWP) basis. A switching mechanism between the two tables is then enabled through different BWPs. In one example of this aspect, it is possible to configure exact same BWPs in terms of BW, sub-carrier spacing (SCS), and center carrier frequency, in order to realize different PDSCH configurations. Enabling different PDSCH configurations consequently allows switching between different MCS tables. Since the BWPs have exact same characteristics (e.g., center carrier frequency), the switching time even for less advanced UEs is close to the DCI-based switching time and compiles with low-latency traffic requirements.

In some aspects, BWPs with different BW and SCS can be configured to realize different PDSCH configurations.

In some aspects, signaling is performed as follows. A first UE-specific BWP-specific configuration of MCS table is received via a first PDSCH configuration associated with a first BWP configured for the UE, then a second UE-specific BWP-specific configuration of MCS table is received via a second PDSCH configuration associated with a second BWP configured for the UE. L or RRC signaling indicates BWP switching. UE is indicated which MCS table to consider from supported candidate MCS tables, as part of the PDSCH configuration on the active BWP. In another example of this aspect, if multiple active BWPs are supported for a UE. DCI-based indication of the MCS table is considered.

In some aspects, similar to PDSCH, for PUSCH, the configuration of an MCS table can be indicated. Currently, for legacy eMBB systems, it is obtained as follows:

---
    mcs-Table          ENUMERATED {qam256}
                       OPTIONAL, -- Need S
    -- Indicates which MCS table the UE shall use for PUSCH with
    transform precoding
    -- Corresponds to L1 parameter
    'MCS-Table-PUSCH-transform-precoding'
    -- When the field is absent the UE applies the value 64QAM
---

In aspects when the UE supports more MCS tables, the PUSCH configuration information element for MCS table entry can be obtained as follows:

---
    mcs-Table        ENUMERATED {qam256, new config}
                     OPTIONAL, -- Need S
    -- Indicates which MCS table the UE shall use for PUSCH with
    transform precoding
    -- Corresponds to L1 parameter
    'MCS-Table-PUSCH-transform-precoding'
    -- When the field is absent the UE applies the value 64QAM,
--- where "new config" is the identifier for another configured MCS table, which can be based on 64QAM but has different SE range than legacy 64QAM MCS table. If this field is absent, the UE can assume a legacy 64qam MCS table. Alternatively, the following signaling can be used:

---
    mcs-Table           ENUMERATED {new config}
                        OPTIONAL, -- Need S
    -- Indicates which MCS table the UE shall use for PUSCH with
    transform precoding
    -- Corresponds to L1 parameter
    'MCS-Table-PUSCH-transform-precoding'
    -- When the field is absent the UE applies the value 64QAM,
--- where "new config" refers to the new MCS table based on highest modulation scheme 16QAM or 64QAM, which may have different SE range than a legacy 64QAM table. If the field is absent, the UE assumes a legacy 64QAM table.

Alternatively, one or more of the configuration messages can be indicated in a DCI. For example, if BLER target needs to be dynamically changed from one transmission to another for a given HARQ process, the DCI may include a field to indicate revised BLER target for CQI reporting.

Figure 2:
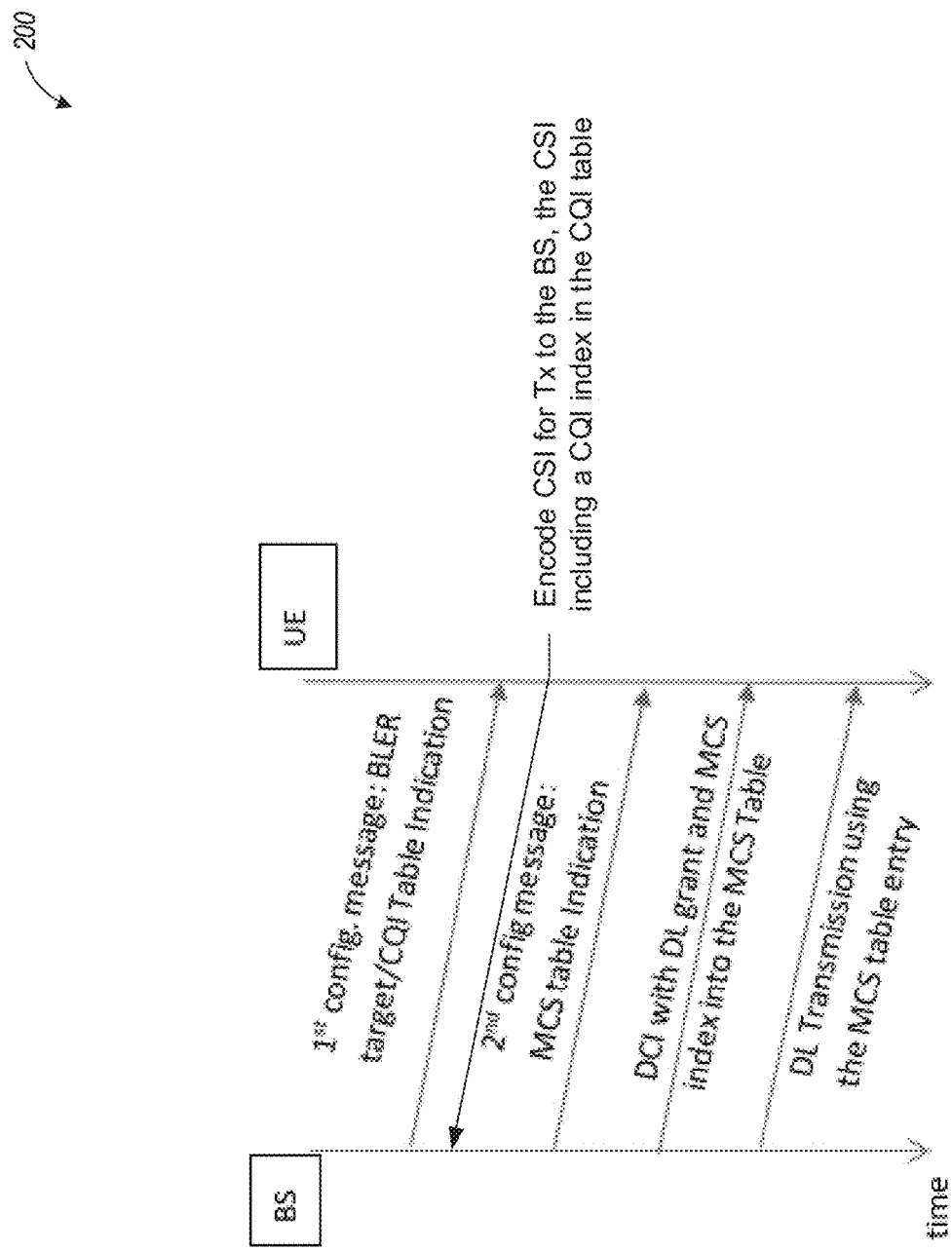
FIG. 2 illustrates a communication exchange between a base station and user equipment for separate configuration of CQI and MCS tables, in accordance with some aspects.

FIG. 2 illustrates a communication exchange between a base station and user equipment for separate configuration of CQI and MCS tables, in accordance with some aspects. Referring to FIG. 2, the communication exchange 200 takes place between a base station such as gNB 111 and UE 101. Initially, the base station communicates a first configuration message which can include a CQI table indication. A block error rate target can also be communicated with the configuration message or it can be implicitly determined, based on the CQI table indication. A CQI index can be obtained based on the block error rate target as well as SNR measurements in connection with a channel state information reference signal. An example determination of a CQI index is illustrated in FIG. 3.

Figure 3:
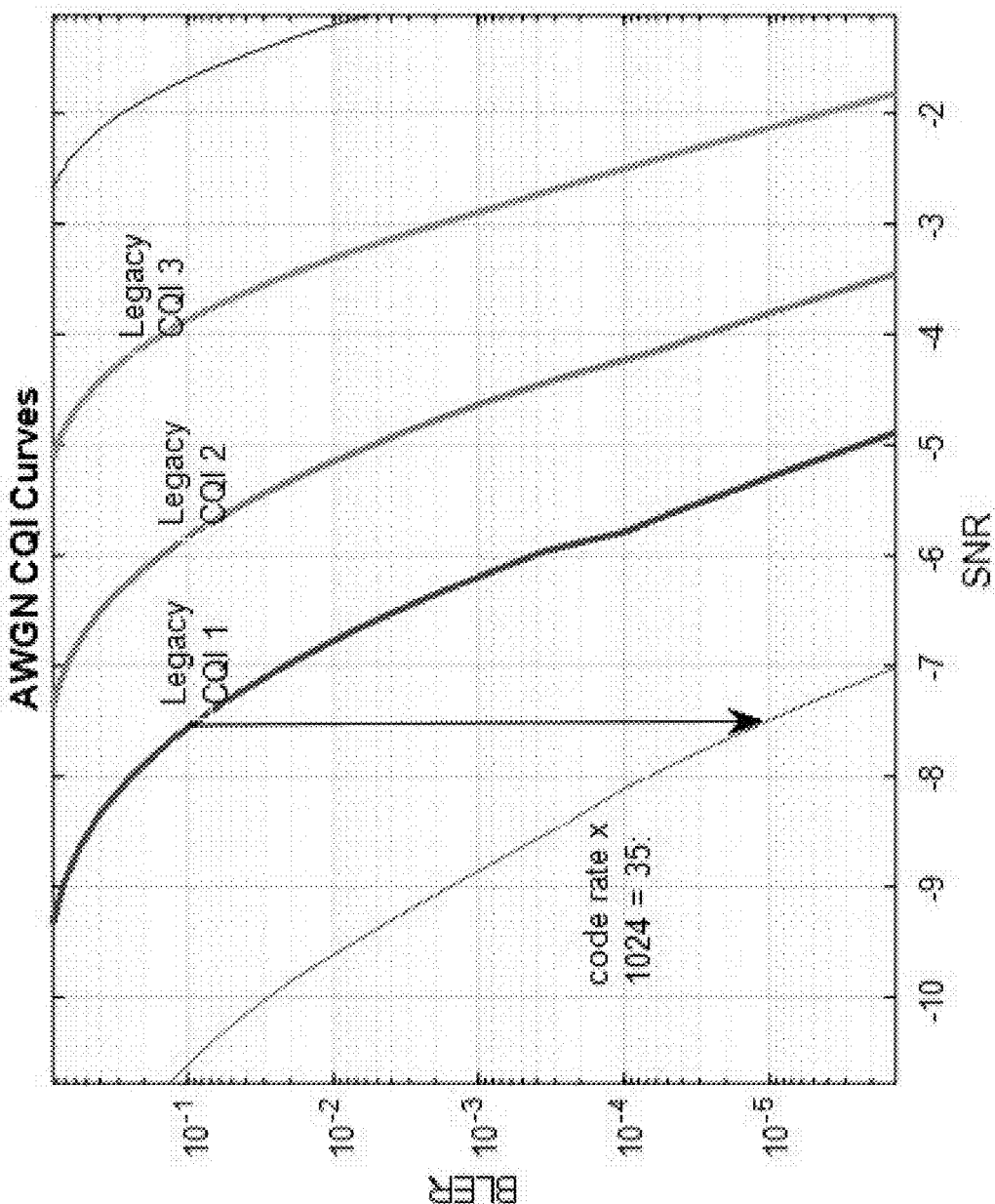
FIG. 3 illustrates example CQI curves for CQI index selection, in accordance with some aspects.

FIG. 3 illustrates example CQI curves for CQI index selection, in accordance with some aspects. Referring to FIG. 3, once a CQI table is indicated the block error rate target can be determined. Additionally, after SNR associated with a CSI reference signal measurement is determined, a CQI index is obtained so that an intersection point between the block error rate and the measured SNR is closest to a CQI index graph (FIG. 3 illustrates CQI curves for CQI indices 1, 2, and 3). Once the CQI index is determined, the CQI index can be reporting back to the base station in a channel state information report.

Referring again to FIG. 2, a second configuration message is communicated from the base station to the UE, which configuration message includes an MCS table indication. The downlink control information (DCI) is then communicated to the UE on a PDCCH, with the DCI including a downlink grant and an MCS index into the MCS table indicated by the second configuration message. Knowing the MCS index into the MCS table, the UE can determine modulation order and target code rate which can be used for decoding a downlink transmission. Subsequently, the base station communicates downlink data on, e.g., PDSCH and the UE can decode the downlink transmission using the MCS table entry with the modulation order and target code rate corresponding to the MCS index. In some aspects, a separate, third, a configuration message can be communicated to the UE with an MCS table indication that can be used for uplink communications.

In some aspects, the UE may have K BLER targets configured with K>=1 corresponding CQI reporting table. The UE may have L>=1 CSI processes setting configured, where L can be larger, equal, or smaller than K. For each CSI process setting, a BLER target, and a corresponding CQI table can be independently configured. It can be useful when a UE supports communication with diverse traffic types. The UE may be configured with M>=1 MCS tables, where M can be equal, smaller, or larger than K. Which MCS table to use for transmission can be indicated to the UE by higher layer signaling, such as RRC signaling. An MCS table selection may or may not be dependent on which CQI table is being used. In one aspect, an MCS table is also configured as part of CSI resource setting, when MCS table to be used for transmission is derived from the CQI table being used for CQI reporting by UE.

(B) Examples of Independent Configuration of BLER Target, CQI Table, and MCS Table.

In some aspects, all the three parameters, namely BLER target, CQI table, and MCS table are configured independently. A first UE-specific configuration message is signaled to the UE indicating a BLER target. There can be N (N being a positive integer) BLER targets for CQI reporting and corresponding CQI tables, where the candidate BLER targets and CQI tables can be UE specific or specified in standards. A second UE-specific configuration message, independent of the first configuration message, is signaled to the UE indicating a CQI table to use for CSI feedback. There can be M (M being a positive integer) CQI tables, where the CQI tables are specified in standards, and an index of the table or enumerated value indicates a particular CQI table. A third UE-specific configuration message, independent of the first two configuration messages, is signaled to the UE to indicate which MCS table, from supported candidate MCS tables, can be assumed by the UE for any DL transmission.

In some aspects, the BLER target for CSI reporting and the CQI table can be configured per CSI resource setting while MCS table can be configured per UE, independently for DL and UL.

In some aspects, operation at a different BLER target than the BLER target used for CQI reporting can be performed as follows: gNB may schedule transmission for a different BLER target than the BLER target used for CQI reporting by the UE. Examples include UE reports CQI for 1e-5 BLER target which may not have the capability to report high SE, gNB may instead use another MCS table with higher SE entries for scheduling transmission. The gNB may apply necessary SNR offset in determining necessary MCS operating point, given the CQI reported, for the target operating BLER. Below, examples of CQI and MCS tables are presented for use in connection with techniques disclosed herein.

CQI Tables

The following CQI Table can be used for 64QAM maximum supported modulation order designed for 10%/BLER target:

| | modulation | code rate × 1024 | efficiency |
|---|---|---|---|
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

Proposed CQI Tables:

The CQI tables proposed hereinbelow can be used for CQI reporting for configured BLER target of $10^{-3}$ and/or $10^{-4}$ and/or $10^{-5}$.

Option 1:

Add K≥1 SE values below minimum SE value of 0.1523 so that high reliability can be achieved at relatively lower SNR and also for the advantage of finer granularity of CQI reporting at low SE. Remove K entries at the bottom which comprise higher SEs.

Candidate Table 1: (Adding one value below minimum SE of legacy CQI table)

| CQI index | modulation | code rate × 1024 | efficiency |
|---|---|---|---|
| 0 | | out of range | |
| 1 | QPSK | 45 | 0.0879 |
| 2 | QPSK | 78 | 0.1523 |
| 3 | QPSK | 120 | 0.2344 |
| 4 | QPSK | 193 | 0.3770 |
| 5 | QPSK | 308 | 0.6016 |
| 6 | QPSK | 449 | 0.8770 |
| 7 | QPSK | 602 | 1.1758 |
| 8 | 16QAM | 378 | 1.4766 |
| 9 | 16QAM | 490 | 1.9141 |
| 10 | 16QAM | 616 | 2.4063 |
| 11 | 64QAM | 466 | 2.7305 |
| 12 | 64QAM | 567 | 3.3223 |
| 13 | 64QAM | 666 | 3.9023 |
| 14 | 64QAM | 772 | 4.5234 |
| 15 | 64QAM | 873 | 5.1152 |

Alternatively, CQI index 1 in the above table can indicate the following code rate values as well. Spectral efficiency values can be obtained by code rate×modulation order (i.e., 2 for QPSK). For example, in the third column, code rate×1024 value of 40 results in 0.0781 efficiency.

| CQI index | modulation | code rate × 1024 | efficiency |
|---|---|---|---|
| 1 | QPSK | 40 or 41 or 42 or 43 or 44 or 46 or 47 or 48 or 49 or 50 or 51 or 52 or 53 or 54 or 55 or 56 or 57 or 58 or 59 or 60 | 0.0781 or 0.08 or 0.082, etc. (Code rate × 2) |

Candidate Table 2: (Adding two values below minimum SE of legacy CQI Table). It is desirable that new SE points added require adequate separation in terms of operating SNR. One approach is to keep a similar SNR step size between other CQI entries of the legacy table.

| CQI index | modulation | code rate × 1024 | efficiency |
|---|---|---|---|
| 0 | | out of range | |
| 1 | QPSK | 35 | 0.0684 |
| 2 | QPSK | 55 | 0.1074 |
| 3 | QPSK | 78 | 0.1523 |
| 4 | QPSK | 120 | 0.2344 |
| 5 | QPSK | 193 | 0.3770 |
| 6 | QPSK | 308 | 0.6016 |
| 7 | QPSK | 449 | 0.8770 |
| 8 | QPSK | 602 | 1.1758 |
| 9 | 16QAM | 378 | 1.4766 |
| 10 | 16QAM | 490 | 1.9141 |
| 11 | 16QAM | 616 | 2.4063 |
| 12 | 64QAM | 466 | 2.7305 |
| 13 | 64QAM | 567 | 3.3223 |
| 14 | 64QAM | 666 | 3.9023 |
| 15 | 64QAM | 772 | 4.5234 |

Alternatively, CQI index 1 and 2 in the above table can indicate the following code rate values as well. Spectral efficiency values can be obtained by code rate×modulation order (i.e., 2 for QPSK). For example, in the third column, code rate×1024 value of 30 results in 0.0586 efficiency.

| CQI index | modulation | code rate × 1024 | efficiency |
|---|---|---|---|
| 1 | QPSK | 30 or 31 or 32 or 33 or 34 or 36 or 37 or 38 or 39 or 40 or 41 or 42 or 43 or 44 or 45 | 0.0585 or 0.0605, etc. (Code rate × 2) |
| 2 | QPSK | 45 or 46 or 47 or 48 or 49 or 50 or 51 or 52 or 53 or 54 or 56 or 57 or 58 or 59 or 60 | 0.0878 or 0.0898, etc. (Code rate × 2) |

An additional example is provided below, where approximately even SNR spacing may be observed:

| CQI index | modulation | code rate × 1024 | efficiency |
|---|---|---|---|
| 0 | | out of range | |
| 1 | QPSK | 30 | 0.0586 |
| 2 | QPSK | 52 | 0.1016 |
| 3 | QPSK | 78 | 0.1523 |
| 4 | QPSK | 120 | 0.2344 |
| 5 | QPSK | 193 | 0.3770 |
| 6 | QPSK | 308 | 0.6016 |
| 7 | QPSK | 449 | 0.8770 |
| 8 | QPSK | 602 | 1.1758 |
| 9 | 16QAM | 378 | 1.4766 |
| 10 | 16QAM | 490 | 1.9141 |
| 11 | 16QAM | 616 | 2.4063 |
| 12 | 64QAM | 466 | 2.7305 |
| 13 | 64QAM | 567 | 3.3223 |
| 14 | 64QAM | 666 | 3.9023 |
| 15 | 64QAM | 772 | 4.5234 |

Another example is provided below, where for CQI index 2, code rate×1024=50:

| CQI index | modulation | code rate × 1024 | efficiency |
|---|---|---|---|
| 0 | | out of range | |
| 1 | QPSK | 30 | 0.0586 |
| 2 | QPSK | 50 | 0.0977 |
| 3 | QPSK | 78 | 0.1523 |
| 4 | QPSK | 120 | 0.2344 |
| 5 | QPSK | 193 | 0.3770 |
| 6 | QPSK | 308 | 0.6016 |
| 7 | QPSK | 449 | 0.8770 |
| 8 | QPSK | 602 | 1.1758 |
| 9 | 16QAM | 378 | 1.4766 |
| 10 | 16QAM | 490 | 1.9141 |
| 11 | 16QAM | 616 | 2.4063 |
| 12 | 64QAM | 466 | 2.7305 |
| 13 | 64QAM | 567 | 3.3223 |
| 14 | 64QAM | 666 | 3.9023 |
| 15 | 64QAM | 772 | 4.5234 |

Candidate Table 3: (finer step size)

Example 1

| CQI index | modulation | code rate × 1024 | efficiency |
|---|---|---|---|
| 0 | | out of range | |
| 1 | QPSK | 60 | 0.1172 |
| 2 | QPSK | 78 | 0.1523 |
| 3 | QPSK | 100 | 0.1953 |
| 4 | QPSK | 120 | 0.2344 |
| 5 | QPSK | 150 | 0.2929 |
| 6 | QPSK | 193 | 0.3770 |
| 7 | QPSK | 238 | 0.4648 |
| 8 | QPSK | 308 | 0.6016 |
| 9 | QPSK | 383 | 0.748 |
| 10 | QPSK | 449 | 0.877 |
| 11 | QPSK | 524 | 1.023 |
| 12 | QPSK | 602 | 1.1758 |
| 13 | 16QAM | 330 | 1.290 |
| 14 | 16QAM | 378 | 1.4766 |
| 15 | 16QAM | 438 | 1.711 |

Example 2

| CQI index | modulation | code rate × 1024 | efficiency |
|---|---|---|---|
| 0 | | out of range | |
| 1 | QPSK | 60 | 0.1172 |
| 2 | QPSK | 78 | 0.1523 |
| 3 | QPSK | 99 | 0.1934 |
| 4 | QPSK | 120 | 0.2344 |
| 5 | QPSK | 157 | 0.3066 |
| 6 | QPSK | 193 | 0.3770 |
| 7 | QPSK | 251 | 0.4902 |
| 8 | QPSK | 308 | 0.6016 |
| 9 | QPSK | 379 | 0.7402 |
| 10 | QPSK | 449 | 0.8770 |
| 11 | QPSK | 526 | 1.0273 |
| 12 | QPSK | 602 | 1.1758 |
| 13 | 16QAM | 679 | 1.3262 |
| 14 | 16QAM | 340 | 1.3281 |
| 15 | 16QAM | 378 | 1.4766 |

Alternatively, CQI index 1 in the above examples 1 and 2 for option 2 can indicate the following code rate values as well. Spectral efficiency values can be obtained by code rate×modulation order (i.e., 2 for QPSK). For example, in the third column code rate×1024, value of 45 results in 45*2/1024=0.0879 efficiency.

| CQI index | modulation | code rate × 1024 | efficiency |
|---|---|---|---|
| 1 | QPSK | 44 or 45 or 46 or 47 or 48 or 49 or 50 or 51 or 52 or 53 or 54 or 55 or 56 or 57 or 58 or 59 or 61 or 62 or 63 or 64 or 65 | Code rate × 2 |

Option 2:

CQI table for very low BLER target may require finer granularity of SE points at the low SE region. Hence, a CQI table can be designed where different granularity in code rate or spectral efficiency steps can be used for different SE region. In particular, finer granularity is used for low SE region and coarse granularity can be used at high SE region. For example, for SE values below x, where x can be between 1 to 3, finer granularity can be used, whereas above coarse granularity of SE points can be used. In some aspects, as provided below, from code rate×1024=60 to code rate×1024=449, relatively fine granularity in code rate or SE steps are considered, whereas from code rate×1024=602 and above, coarse granularity is considered.

| CQI index | modulation | code rate × 1024 | efficiency |
|---|---|---|---|
| 0 | | out of range | |
| 1 | QPSK | 60 | 0.1172 |
| 2 | QPSK | 78 | 0.1523 |
| 3 | QPSK | 99 | 0.1934 |
| 4 | QPSK | 120 | 0.2344 |
| 5 | QPSK | 157 | 0.3066 |
| 6 | QPSK | 193 | 0.3770 |
| 7 | QPSK | 251 | 0.4902 |
| 8 | QPSK | 308 | 0.6016 |
| 9 | QPSK | 379 | 0.7402 |
| 10 | QPSK | 449 | 0.8770 |
| 11 | QPSK | 602 | 1.1758 |
| 12 | 16QAM | 378 | 1.4766 |
| 13 | 16QAM | 490 | 1.9141 |
| 14 | 64QAM | 567 | 3.3223 |
| 15 | 64QAM | 772 | 4.5234 |

Alternatively, CQI index 1 in the above example can indicate the following code rate values as well. Spectral efficiency values can be obtained by code rate×modulation order (i.e., 2 for QPSK). For example, in the third column code rate×1024, value of 45 results in 45*2/1024=0.0879 efficiency.

| CQI index | modulation | code rate × 1024 | efficiency |
|---|---|---|---|
| 1 | QPSK | 44 or 45 or 46 or 47 or 48 or 49 or 50 or 51 or 52 or 53 or 54 or 55 or 56 or 57 or 58 or 59 or 61 or 62 or 63 or 64 or 65 | Code rate × 2 |

Alternatively, the above table in Option 2 may have the highest modulation order to be 16QAM.

Option 3:

In some aspects, a CQI table is proposed so that UE may operate at same SNR operating range as for indicating CQI indices of legacy CQI table. This requires finding MCS for which a target BLER which requires the same operating SNR for a given CQI index. In FIG. 3 where AWGN CQI curves are shown for LDPC base graph 2, a new MCS point is identified for target BLER of $10^{-5}$ for approximately same operating SNR point, i.e., for the new BLER target of $10^{-5}$ UE will report CQI index 1, however value of MCS for CQI index 1 would be different than CQI index in legacy CQI table.

An example is provided below for target BLER of $10^{-5}$:

Efficiency can be obtained by code rate×modulation order, where modulation order for QPSK, 16QAM, and 64QAM are 2, 4, 6 respectively. In the table below, m:n denotes the range of values from m to n with an increment of 1. It implies one of the values from this range can be used for code rate×1024 for a given CQI index. For example, one of the value from range 31:40 can be used for code rate× 1024 for CQI index 1.

| CQI index | modulation | code rate × 1024 | efficiency |
|---|---|---|---|
| 0 | | out of range | |
| 1 | QPSK | 31:40 | Value of the box in left × 2/1024 |
| 2 | QPSK | 60:75 | Value of the box in left × 2/1024 |
| 3 | QPSK | 108:120 | Value of the box in left × 2/1024 |
| 4 | QPSK | 208:223 | Value of the box in left × 2/1024 |
| 5 | QPSK | 338:353 | Value of the box in left × 2/1024 |
| 6 | QPSK | 494:509 | Value of the box in left × 2/1024 |
| 7 | 16QAM | 295:310 | Value of the box in left × 4/1024 |
| 8 | 16QAM | 393:408 | Value of the box in left × 4/1024 |

-continued

| CQI index | modulation | code rate × 1024 | efficiency |
|---|---|---|---|
| 9 | 16QAM | 535:550 | Value of the box in left × 4/1024 |
| 10 | 64QAM | 390:405 | Value of the box in left × 6/1024 |
| 11 | 64QAM | 496:511 | Value of the box in left × 6/1024 |
| 12 | 64QAM | 597:612 | Value of the box in left × 6/1024 |
| 13 | 64QAM | 693:717 | Value of the box in left × 6/1024 |
| 14 | 64QAM | 790:823 | Value of the box in left × 6/1024 |
| 15 | 64QAM | 870:898 | Value of the box in left × 6/1024 |

Proposed MCS Tables:

A legacy MCS table based on a legacy CQI table is provided below. As noted from the table, the minimum MCS point in the MCS table does not start at the minimum MCS point of CQI table. Additionally, MCS index 0 matches CQI index 2 in legacy CQI table.

| MCS Index $I_{MCS}$ | Modulation Order $Q_m$ | Target code Rate × [1024] R | Spectral efficiency |
|---|---|---|---|
| 0 | 2 | 120 | 0.2344 |
| 1 | 2 | 157 | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |
| 17 | 6 | 438 | 2.5664 |
| 18 | 6 | 466 | 2.7305 |
| 19 | 6 | 517 | 3.0293 |
| 20 | 6 | 567 | 3.3223 |
| 21 | 6 | 616 | 3.6094 |
| 22 | 6 | 666 | 3.9023 |
| 23 | 6 | 719 | 4.2129 |
| 24 | 6 | 772 | 4.5234 |
| 25 | 6 | 822 | 4.8164 |
| 26 | 6 | 873 | 5.1152 |
| 27 | 6 | 910 | 5.3320 |
| 28 | 6 | 948 | 5.5547 |
| 29 | 2 | reserved | |
| 30 | 4 | reserved | |
| 31 | 6 | reserved | |

Figure 4:
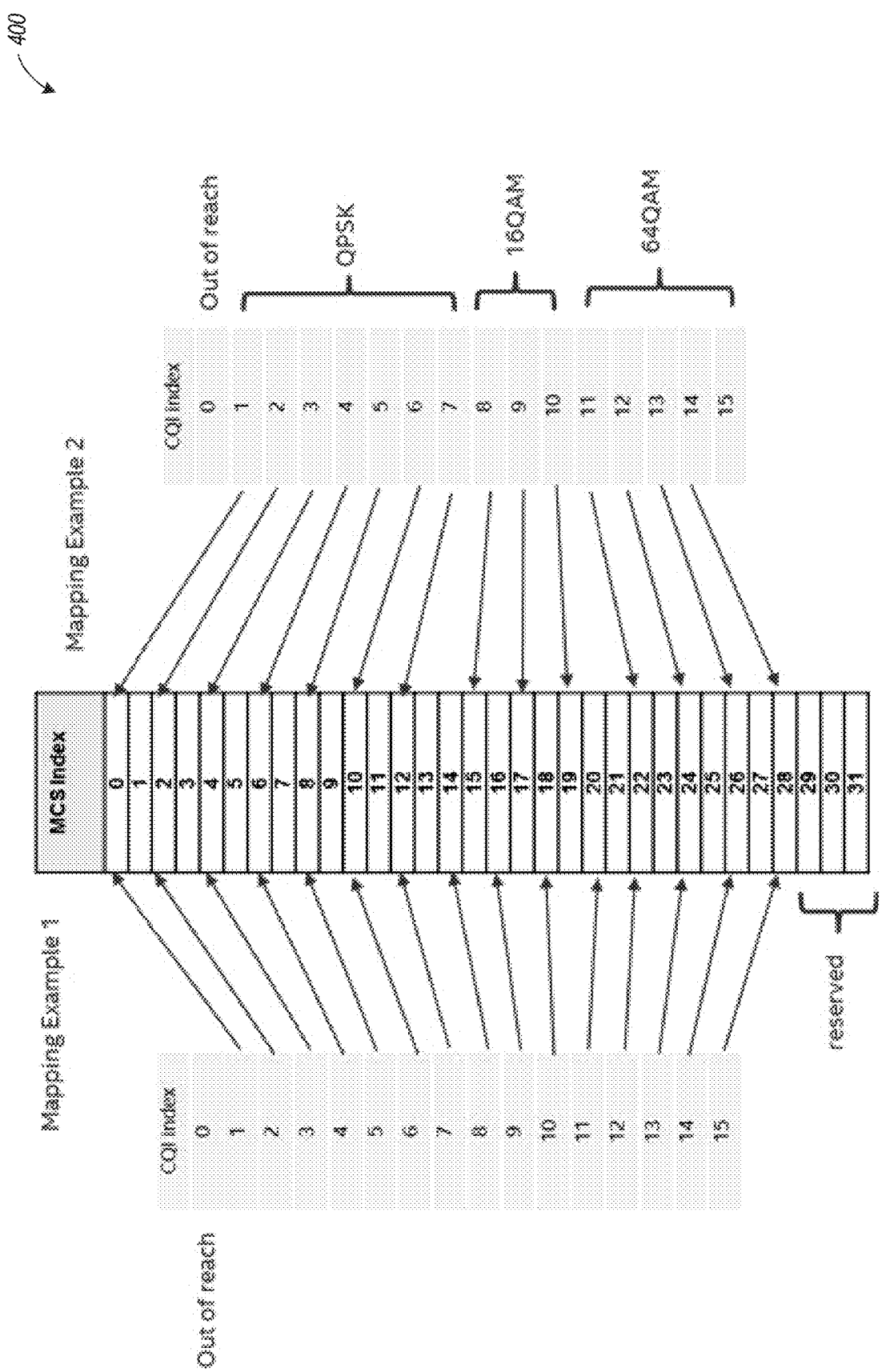
FIG. 4 illustrates an example construction of an MCS table using a CQI table, in accordance with some aspects.
Figure 5:
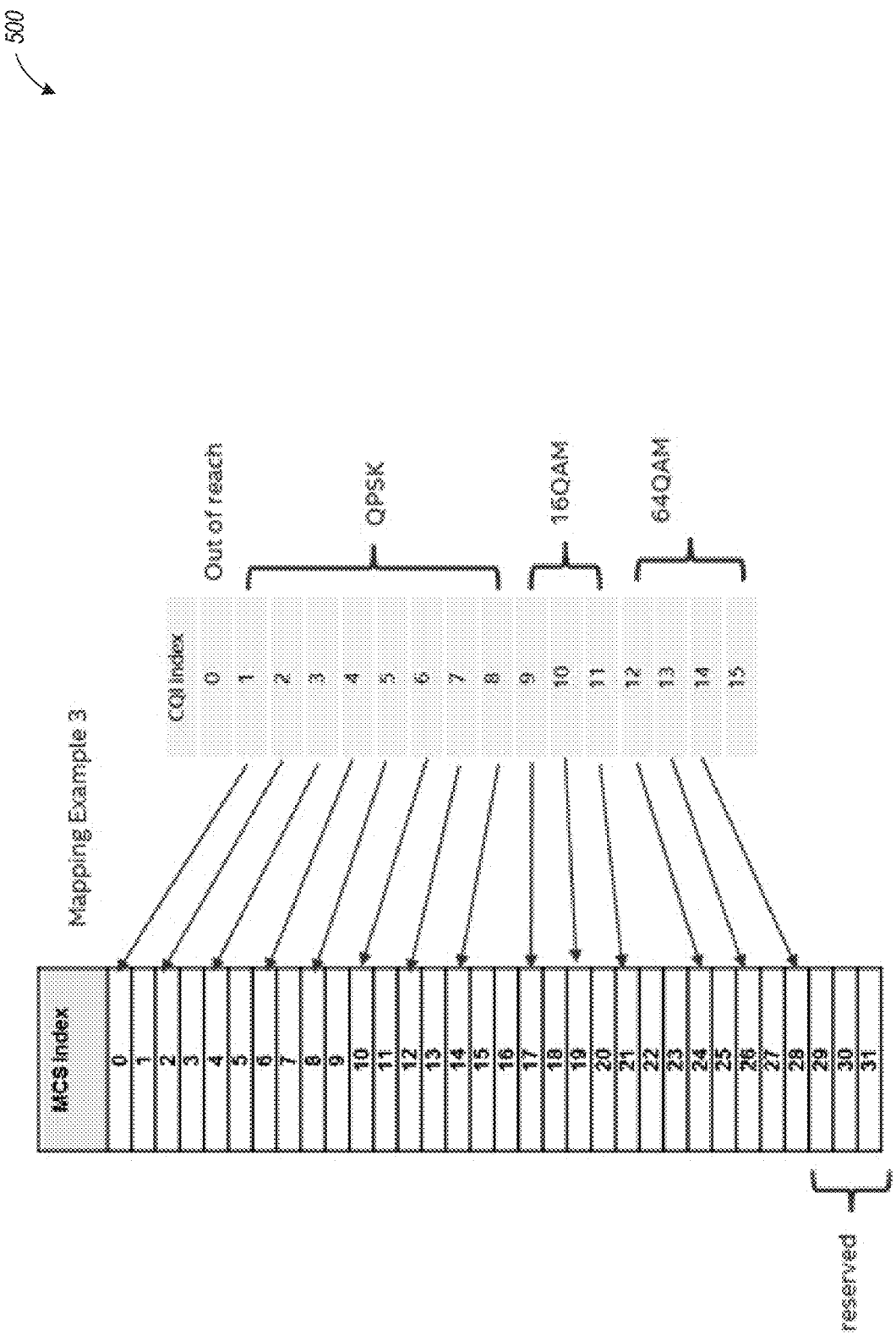
FIG. 5 illustrates another example construction of an MCS table using a CQI table, in accordance with some aspects.

In some aspects, an MCS table may keep the minimum and/or maximum entries of a given CQI table. Having the option to utilize lower SE point can be beneficial to achieve desired high reliability for URLLC services. In some aspects, a 5-bit MCS table can be used, i.e., there are 32 entries in the table. More generally, MCS tables can have the same or fewer entries than the CQI table. In FIG. 4 and FIG. 5, there is illustrated how a 5-bit MCS table (i.e., 32 entries) can be derived from a reference 4-bit CQI table (i.e., 16 entries).

FIG. 4 illustrates example construction 400 of an MCS table using a CQI table, in accordance with some aspects. In mapping example 1, both minimum and maximum SE points are used in the MCS table. Whereas in example 2, the minimum SE point is kept however maximum SE point in the MCS table and CQI table is different. This is because two additional interpolated points are added, one at 14 and another at 21. For Mapping example 1, interpolated code rate for MCS indices that are not matched to indices of a CQI table can be obtained as follows:

Code rate×1024 (index IMCS)=Average of code rate× 1024 values of index (IMCS−1) and (IMCS+1), when IMCS=(1.3, 5, 7, . . . , 25, 27), except when (IMCS−1) and (IMCS+1) do not correspond to same modulation order. If the average is not an integer, nearest lower or higher integer value can be used. Note that to obtain (index IMCS by interpolation, (IMCS−1) and (IMCS+1), should correspond to the same modulation order. Rest of the entries of index {1, 3, 5, 7, . . . , 25, 27} are obtained by extrapolation of nearest higher or lower SE or code rate values of a given modulation scheme. Example tables are provided further below.

Mapping example 1 can be used with any CQI table discussed above. In another embodiment, reserved entries such as those in the legacy table are not used in the new proposed MCS table, instead of higher SE points are added.

For Mapping example 2, interpolated code rate for MCS indices that are not matched to indices of a CQI table can be obtained as follows:

Code rate×1024 (index $I_{MCS}$)=Average of code rate×1024 values of index (IMCS−1) and (IMCS+1), when IMCS={1, 3, 5, 7, 9, 11, 16, 18, 23, 25, 27}. If the average is not an integer, nearest lower or higher integer value can be used.

Code rate×1024 (index IMCS), IMCS=13 and 20 is obtained by extrapolating the code rate×1024 value of index IMCS=12 and 19, respectively, to a higher value. Code rate×1024 (index IMCS), IMCS=14 and 21 are obtained by extrapolating the code rate×1024 value of, index IMCS=15 and 22, respectively, to a lower value.

In some aspects, mapping example 2 can be used with candidate CQI table 1 in option 1 above. More generally, where CQI Indices 1 to 7 are used for QPSK, 8 to 10 are used for 16QAM, 11 to 15 are used for 64QAM. In another embodiment, reserved entries such as those in the legacy table are not used in the new proposed MCS table, instead of higher SE points are added. For example, CQI index 15 can be mapped to MCS index 30, and MCS index 29 is obtained by interpolation (cf. the rules for obtaining interpolated value described above for Mapping example 1 and 2) of MCS indices 28 and 30. MCS index 31 can be obtained by extrapolating the code rate of MCS index 30 to a higher value. In some aspects, modulation order of MCS indices 29, 30, 31 can be 6, alternatively, it can be 2, 4, or 8.

FIG. 5 illustrates another example construction 500 of an MCS table using a CQI table, in accordance with some aspects. In FIG. 5 there is illustrated another mapping example 3 which can be used with CQI table 2 in option 1. More generally, where CQI indices 1 to 8 are used for QPSK, 9 to 11 are used for 16QAM, 12 to 15 are used for 64QAM. Interpolated and extrapolated values can be obtained in a similar fashion as described in mapping example 2, such as using the following technique:

Code rate×1024 (index IMCS)=Average of code rate× 1024 values of index (IMCS−1) and (IMCS+1), when IMCS={1, 3, 5, 7, 9, 11, 13, 18, 20, 25, 27}. If the average is not an integer, nearest lower or higher integer value can be used.

Code rate×1024 (index IMCS), IMCS=15 and 22 are obtained by extrapolating the code rate×1024 value of index IMCS=14 and 21, respectively, to a higher value. Code rate×1024 (index IMCS), IMCS=16 and 23 are obtained by extrapolating the code rate×1024 value of, index IMCS=17 and 24, respectively, to a lower value. Alternatively, reserved entries can be used in similar fashion as discussed in Mapping example 2.

In some aspects, an MCS table is obtained starting at a minimum value of CQI table. As there are 15 entries in a CQI table, and MCS table allows for 32 entries, entries from CQI table are preserved and additional entries are obtained by interpolation of SE points of the consecutive CQI indices or extrapolation of some CQI entries.

In some aspects, an MCS table may utilize the reserved entries by explicitly indicating both M and CR.

Hereinbelow, specific examples of MCS tables are illustrated for some of the above CQI tables presented. In some aspects, MCS tables can be obtained for other CQI tables following the principles described above.

Proposed MCS Table 1a-1 (based on proposed CQI Table 1 in Option 1, keeping reserved entries):

The following MCS table is obtained based on mapping example 2:

| MCS Index | Modulation Order | Target code Rate × [1024] | Spectral efficiency |
|---|---|---|---|
| 0 | 2 | 45 | 0.0879 |
| 1 | 2 | 61 or 61.5 or 62 | 0.1191 or 0.1211 |
| 2 | 2 | 78 | 0.1523 |
| 3 | 2 | 99 | 0.1934 |
| 4 | 2 | 120 | 0.2344 |
| 5 | 2 | 157 | 0.3066 |
| 6 | 2 | 193 | 0.3770 |
| 7 | 2 | 251 | 0.4902 |
| 8 | 2 | 308 | 0.6016 |
| 9 | 2 | 379 | 0.7402 |
| 10 | 2 | 449 | 0.8770 |
| 11 | 2 | 526 | 1.0273 |
| 12 | 2 | 602 | 1.1758 |
| 13 | 2 | 679 | 1.3262 |
| 14 | 4 | 340 | 1.3281 |
| 15 | 4 | 378 | 1.4766 |
| 16 | 4 | 434 | 1.6953 |
| 17 | 4 | 490 | 1.9141 |
| 18 | 4 | 553 | 2.1602 |
| 19 | 4 | 616 | 2.4063 |
| 20 | 4 | 658 | 2.5703 |
| 21 | 6 | 438 | 2.5664 |
| 22 | 6 | 466 | 2.7305 |
| 23 | 6 | 517 | 3.0293 |
| 24 | 6 | 567 | 3.3223 |
| 25 | 6 | 616 | 3.6094 |
| 26 | 6 | 666 | 3.9023 |
| 27 | 6 | 719 | 4.2129 |
| 28 | 6 | 772 | 4.5234 |
| 29 | 2 | reserved | |
| 30 | 4 | reserved | |
| 31 | 6 | reserved | |

Proposed MCS Table 1a-2 (based on proposed CQI Table 1 in Option 1, keeping reserved entries):

The following MCS table is obtained based on mapping example 1. The benefit is that a higher SE point can be used.

| MCS Index | Modulation Order | Target code Rate × [1024] | Spectral efficiency |
|---|---|---|---|
| 0 | 2 | 45 | 0.0879 |
| 1 | 2 | 61 or 62 | 0.1191 or 0.1211 |
| 2 | 2 | 78 | 0.1523 |
| 3 | 2 | 99 | 0.1934 |
| 4 | 2 | 120 | 0.2344 |
| 5 | 2 | 157 | 0.3066 |
| 6 | 2 | 193 | 0.3770 |
| 7 | 2 | 251 | 0.4902 |
| 8 | 2 | 308 | 0.6016 |
| 9 | 2 | 379 | 0.7402 |
| 10 | 2 | 449 | 0.8770 |
| 11 | 2 | 526 | 1.0273 |
| 12 | 2 | 602 | 1.1758 |
| 13 | 4 | 340 | 1.3281 |
| 14 | 4 | 378 | 1.4766 |
| 15 | 4 | 434 | 1.6953 |
| 16 | 4 | 490 | 1.9141 |
| 17 | 4 | 553 | 2.1602 |
| 18 | 4 | 616 | 2.4063 |
| 19 | 6 | 438 | 2.5664 |
| 20 | 6 | 466 | 2.7305 |
| 21 | 6 | 517 | 3.0293 |
| 22 | 6 | 567 | 3.3223 |
| 23 | 6 | 616 | 3.6094 |
| 24 | 6 | 666 | 3.9023 |
| 25 | 6 | 719 | 4.2129 |
| 26 | 6 | 772 | 4.5234 |
| 27 | 6 | 822 | 4.8164 |
| 28 | 6 | 873 | 5.1152 |
| 29 | 2 | reserved | |
| 30 | 4 | reserved | |
| 31 | 6 | reserved | | or the following MCS table can be used:

| MCS Index | Modulation Order | Target code Rate × [1024] | Spectral efficiency |
|---|---|---|---|
| 0 | 2 | 45 | 0.0879 |
| 1 | 2 | 61 or 62 | 0.1191 or 0.1211 |
| 2 | 2 | 78 | 0.1523 |
| 3 | 2 | 99 | 0.1934 |
| 4 | 2 | 120 | 0.2344 |
| 5 | 2 | 157 | 0.3066 |
| 6 | 2 | 193 | 0.3770 |
| 7 | 2 | 251 | 0.4902 |
| 8 | 2 | 308 | 0.6016 |
| 9 | 2 | 379 | 0.7402 |
| 10 | 2 | 449 | 0.8770 |
| 11 | 2 | 526 | 1.0273 |
| 12 | 2 | 602 | 1.1758 |
| 13 | 2 | 679 | 1.3262 |
| 14 | 4 | 378 | 1.4766 |
| 15 | 4 | 434 | 1.6953 |
| 16 | 4 | 490 | 1.9141 |
| 17 | 4 | 553 | 2.1602 |
| 18 | 4 | 616 | 2.4063 |
| 19 | 4 | 658 | 2.5703 |
| 20 | 6 | 466 | 2.7305 |
| 21 | 6 | 517 | 3.0293 |
| 22 | 6 | 567 | 3.3223 |
| 23 | 6 | 616 | 3.6094 |
| 24 | 6 | 666 | 3.9023 |
| 25 | 6 | 719 | 4.2129 |
| 26 | 6 | 772 | 4.5234 |
| 27 | 6 | 822 | 4.8164 |
| 28 | 6 | 873 | 5.1152 |
| 29 | 2 | reserved | |
| 30 | 4 | reserved | |
| 31 | 6 | reserved | |

Proposed MCS Table 1b (based on proposed CQI Table 1 in Option 1, explicitly indicate MCS for the last three entries). Following mapping example 2:

| MCS Index | Modulation Order | Target code Rate × [1024] | Spectral efficiency |
|---|---|---|---|
| 0 | 2 | 45 | 0.0879 |
| 1 | 2 | 61 or 62 | 0.1191 or 0.1211 |
| 2 | 2 | 78 | 0.1523 |
| 3 | 2 | 99 | 0.1934 |
| 4 | 2 | 120 | 0.2344 |
| 5 | 2 | 157 | 0.3066 |
| 6 | 2 | 193 | 0.3770 |
| 7 | 2 | 251 | 0.4902 |
| 8 | 2 | 308 | 0.6016 |
| 9 | 2 | 379 | 0.7402 |
| 10 | 2 | 449 | 0.8770 |
| 11 | 2 | 526 | 1.0273 |
| 12 | 2 | 602 | 1.1758 |
| 13 | 2 | 679 | 1.3262 |
| 14 | 4 | 340 | 1.3281 |
| 15 | 4 | 378 | 1.4766 |
| 16 | 4 | 434 | 1.6953 |
| 17 | 4 | 490 | 1.9141 |
| 18 | 4 | 553 | 2.1602 |
| 19 | 4 | 616 | 2.4063 |
| 20 | 4 | 658 | 2.5703 |
| 21 | 6 | 438 | 2.5664 |
| 22 | 6 | 466 | 2.7305 |
| 23 | 6 | 517 | 3.0293 |
| 24 | 6 | 567 | 3.3223 |
| 25 | 6 | 616 | 3.6094 |
| 26 | 6 | 666 | 3.9023 |
| 27 | 6 | 719 | 4.2129 |
| 28 | 6 | 772 | 4.5234 |
| 29 | 6 | 822 or 823 | 4.8164 or 4.8223 |
| 30 | 6 | 873 | 4.8223 |
| 31 | 6 | 910 or 911 | 5.3322 or 5.3379 |

Note that following mapping example 1 and MCS tables 1a-2, the above table 1b can be revised to have higher SE points be removing some inter/extrapolated entries.

Note that MCS index 0 assumes the same modulation and code rate for CQI index 1 in Table 1 in Option 1. Hence, the code rate in MCS index 0 will change accordingly if a different value for the code rate for CQI index 1 is used (some examples are given below Table 1 in Option 1).

In the above examples, MCS index 1 code rate can be an interpolated value between MCS index 0 and MCS index 2. In particular, value of code rate×1024 for MCS index 1 can be ceil (average of values of code rate×1024 of MCS index 0 and 2) or floor (average of values of code rate×1024 of MCS index 0 and 2), where ceil (.) and floor (.) indicate rounding to next higher integer and rounding to next smaller integer, respectively, if the value inside the function is a fraction, otherwise just average value of the code rates are taken as to final value for MCS index 1.

Proposed MCS Table 2a-1 (based on proposed CQI Table 2 in Option 1, keeping reserved entries):

Following mapping example 2

| MCS Index | Modulation Order | Target code Rate × [1024] | Spectral efficiency |
|---|---|---|---|
| 0 | 2 | 35 | 0.0684 |
| 1 | 2 | 45 | 0.0879 |
| 2 | 2 | 55 | 0.1074 |
| 3 | 2 | 66 or 67 | 0.1289 or 0.13086 |
| 4 | 2 | 78 | 0.1523 |
| 5 | 2 | 99 | 0.1934 |
| 6 | 2 | 120 | 0.2344 |
| 7 | 2 | 157 | 0.3066 |
| 8 | 2 | 193 | 0.3770 |
| 9 | 2 | 251 | 0.4902 |
| 10 | 2 | 308 | 0.6016 |
| 11 | 2 | 379 | 0.7402 |
| 12 | 2 | 449 | 0.8770 |
| 13 | 2 | 526 | 1.0273 |
| 14 | 2 | 602 | 1.1758 |
| 15 | 2 | 679 | 1.3262 |
| 16 | 4 | 340 | 1.3281 |
| 17 | 4 | 378 | 1.4766 |
| 18 | 4 | 434 | 1.6953 |
| 19 | 4 | 490 | 1.9141 |
| 20 | 4 | 553 | 2.1602 |
| 21 | 4 | 616 | 2.4063 |
| 22 | 4 | 658 | 2.5703 |
| 23 | 6 | 438 | 2.5664 |
| 24 | 6 | 466 | 2.7305 |
| 25 | 6 | 517 | 3.0293 |
| 26 | 6 | 567 | 3.3223 |
| 27 | 6 | 616 | 3.6094 |
| 28 | 6 | 666 | 3.9023 |
| 29 | 2 | reserved | |
| 30 | 4 | reserved | |
| 31 | 6 | reserved | |

An additional example is provided below based on the same policy:

| MCS Index | Modulation Order | Target code Rate × [1024] | Spectral efficiency |
|---|---|---|---|
| 0 | 2 | 30 | 0.0586 |
| 1 | 2 | 41 | 0.0801 |
| 2 | 2 | 52 | 0.1016 |
| 3 | 2 | 65 | 0.1270 |
| 4 | 2 | 78 | 0.1523 |
| 5 | 2 | 99 | 0.1934 |
| 6 | 2 | 120 | 0.2344 |
| 7 | 2 | 157 | 0.3066 |
| 8 | 2 | 193 | 0.3770 |
| 9 | 2 | 251 | 0.4902 |
| 10 | 2 | 308 | 0.6016 |
| 11 | 2 | 379 | 0.7402 |
| 12 | 2 | 449 | 0.8770 |
| 13 | 2 | 526 | 1.0273 |
| 14 | 2 | 602 | 1.1758 |
| 15 | 2 | 679 | 1.3262 |
| 16 | 4 | 340 | 1.3281 |
| 17 | 4 | 378 | 1.4766 |
| 18 | 4 | 434 | 1.6953 |
| 19 | 4 | 490 | 1.9141 |
| 20 | 4 | 553 | 2.1602 |
| 21 | 4 | 616 | 2.4063 |
| 22 | 4 | 658 | 2.5703 |
| 23 | 6 | 438 | 2.5664 |
| 24 | 6 | 466 | 2.7305 |
| 25 | 6 | 517 | 3.0293 |
| 26 | 6 | 567 | 3.3223 |
| 27 | 6 | 616 | 3.6094 |
| 28 | 6 | 666 | 3.9023 |
| 29 | 2 | reserved | |
| 30 | 4 | reserved | |
| 31 | 6 | reserved | |

Proposed MCS Table 2a-1 (based on proposed CQI Table 2 in Option 1, keeping reserved entries):

Following mapping example 1, a benefit for the following MCS table is higher SE points.

| MCS Index | Modulation Order | Target code Rate × [1024] | Spectral efficiency |
|---|---|---|---|
| 0 | 2 | 35 | 0.0684 |
| 1 | 2 | 45 | 0.0879 |
| 2 | 2 | 55 | 0.1074 |
| 3 | 2 | 66 or 67 | 0.1289 or 0.13086 |
| 4 | 2 | 78 | 0.1523 |
| 5 | 2 | 99 | 0.1934 |
| 6 | 2 | 120 | 0.2344 |
| 7 | 2 | 157 | 0.3066 |
| 8 | 2 | 193 | 0.3770 |
| 9 | 2 | 251 | 0.4902 |
| 10 | 2 | 308 | 0.6016 |
| 11 | 2 | 379 | 0.7402 |
| 12 | 2 | 449 | 0.8770 |
| 13 | 2 | 526 | 1.0273 |
| 14 | 2 | 602 | 1.1758 |
| 15 | 4 | 340 | 1.3281 |
| 16 | 4 | 378 | 1.4766 |
| 17 | 4 | 434 | 1.6953 |
| 18 | 4 | 490 | 1.9141 |
| 19 | 4 | 553 | 2.1602 |
| 20 | 4 | 616 | 2.4063 |
| 21 | 6 | 438 | 2.5664 |
| 22 | 6 | 466 | 2.7305 |
| 23 | 6 | 517 | 3.0293 |
| 24 | 6 | 567 | 3.3223 |
| 25 | 6 | 616 | 3.6094 |
| 26 | 6 | 666 | 3.9023 |
| 27 | 6 | 719 | 4.2129 |
| 28 | 6 | 772 | 4.5234 |
| 29 | 2 |  | reserved |
| 30 | 4 |  | reserved |
| 31 | 6 |  | reserved | or the following MCS table can be used as well:

| MCS Index | Modulation Order | Target code Rate × [1024] | Spectral efficiency |
|---|---|---|---|
| 0 | 2 | 35 | 0.0684 |
| 1 | 2 | 45 | 0.0879 |
| 2 | 2 | 55 | 0.1074 |
| 3 | 2 | 66 or 67 | 0.1289 or 0.13086 |
| 4 | 2 | 78 | 0.1523 |
| 5 | 2 | 99 | 0.1934 |
| 6 | 2 | 120 | 0.2344 |
| 7 | 2 | 157 | 0.3066 |
| 8 | 2 | 193 | 0.3770 |
| 9 | 2 | 251 | 0.4902 |
| 10 | 2 | 308 | 0.6016 |
| 11 | 2 | 379 | 0.7402 |
| 12 | 2 | 449 | 0.8770 |
| 13 | 2 | 526 | 1.0273 |
| 14 | 2 | 602 | 1.1758 |
| 15 | 2 | 679 | 1.3262 |
| 16 | 4 | 378 | 1.4766 |
| 17 | 4 | 434 | 1.6953 |
| 18 | 4 | 490 | 1.9141 |
| 19 | 4 | 553 | 2.1602 |
| 20 | 4 | 616 | 2.4063 |
| 21 | 4 | 658 | 2.5703 |
| 22 | 6 | 466 | 2.7305 |
| 23 | 6 | 517 | 3.0293 |
| 24 | 6 | 567 | 3.3223 |
| 25 | 6 | 616 | 3.6094 |
| 26 | 6 | 666 | 3.9023 |
| 27 | 6 | 719 | 4.2129 |
| 28 | 6 | 772 | 4.5234 |
| 29 | 2 |  | reserved |
| 30 | 4 |  | reserved |
| 31 | 6 |  | reserved |

Proposed MCS Table 2b (based on proposed CQI Table 2 in Option 1, explicitly indicating MCS at indices 29 to 31):

| MCS Index | Modulation Order | Target code Rate × [1024] | Spectral efficiency |
|---|---|---|---|
| 0 | 2 | 35 | 0.0684 |
| 1 | 2 | 45 | 0.0879 |
| 2 | 2 | 55 | 0.1074 |
| 3 | 2 | 66 or 67 | 0.1289 or 0.13086 |
| 4 | 2 | 78 | 0.1523 |
| 5 | 2 | 99 | 0.1934 |
| 6 | 2 | 120 | 0.2344 |
| 7 | 2 | 157 | 0.3066 |
| 8 | 2 | 193 | 0.3770 |
| 9 | 2 | 251 | 0.4902 |
| 10 | 2 | 308 | 0.6016 |
| 11 | 2 | 379 | 0.7402 |
| 12 | 2 | 449 | 0.8770 |
| 13 | 2 | 526 | 1.0273 |
| 14 | 2 | 602 | 1.1758 |
| 15 | 2 | 679 | 1.3262 |
| 16 | 4 | 340 | 1.3281 |
| 17 | 4 | 378 | 1.4766 |
| 18 | 4 | 434 | 1.6953 |
| 19 | 4 | 490 | 1.9141 |
| 20 | 4 | 553 | 2.1602 |
| 21 | 4 | 616 | 2.4063 |
| 22 | 4 | 658 | 2.5703 |
| 23 | 6 | 438 | 2.5664 |
| 24 | 6 | 466 | 2.7305 |
| 25 | 6 | 517 | 3.0293 |
| 26 | 6 | 567 | 3.3223 |
| 27 | 6 | 616 | 3.6094 |
| 28 | 6 | 666 | 3.9023 |
| 29 | 2 | 719 | 4.2129 |
| 30 | 4 | 772 | 4.5234 |
| 31 | 6 | 822 or 823 | 4.8164 or 4.8223 |

Note that following mapping example 1 and MCS tables 2a-2, the above table 2b can be revised to have higher SE points be removing some inter/extrapolated entries.

As discussed above, for MCS indices 0 and 2 in above two tables, the value of code rate×1024 is taken from the value of code rate×1024 of CQI indices 1 and 2, respectively, of Table 2 in Option 1. Some alternative values are suggested for a code rate of CQI indices 1 and 2 below table 2 in Option 2. Code rate values of MCS indices 1 and 3 are obtained by interpolating the code rate values of MCS indices (0 and 2) and (2 and 4), respectively. For example, code rate values of 1 (3) are the average of code rate×1024 values of index 0(2) and 2(4). If the average is not an integer, nearest lower or higher integer value can be used. Some further explicit examples of MCS tables are provided below.

Similarly, MCS tables based on other CQI tables can be obtained, following the mapping examples disclosed herein.

Additional Examples of MCS Tables (1) Variants of Proposed MCS Tables 2a-1 or 2b Discussed Above Below, additional examples are illustrated where alternative entries for MCS indices 0 to 3 can be considered in the MCS tables 2a-1, 2b based on candidate CQI Table 2 in option 1. Rest of the entries can be the same as shown in MCS tables 2a-1, 2b presented above. The variants below result in approximately even SNR spacing between consecutive MCS indices pair.

Variant-1

| MCS Index | Modulation Order | Target code Rate × [1024] | Spectral efficiency |
|---|---|---|---|
| 0 | 2 | 30 | 0.0586 |
| 1 | 2 | 40 | 0.0781 |

-continued

| MCS Index | Modulation Order | Target code Rate × [1024] | Spectral efficiency |
|---|---|---|---|
| 2 | 2 | 50 | 0.0977 |
| 3 | 2 | 64 | 0.1250 |

For Variant-1, the full MCS table is provided below after adding MCS indices 4 onwards shown in MCS Table 2a-1:

| MCS Index | Modulation Order | Target code Rate × [1024] | Spectral efficiency |
|---|---|---|---|
| 0 | 2 | 30 | 0.0586 |
| 1 | 2 | 40 | 0.0781 |
| 2 | 2 | 50 | 0.0977 |
| 3 | 2 | 64 | 0.1250 |
| 4 | 2 | 78 | 0.1523 |
| 5 | 2 | 99 | 0.1934 |
| 6 | 2 | 120 | 0.2344 |
| 7 | 2 | 157 | 0.3066 |
| 8 | 2 | 193 | 0.3770 |
| 9 | 2 | 251 | 0.4902 |
| 10 | 2 | 308 | 0.6016 |
| 11 | 2 | 379 | 0.7402 |
| 12 | 2 | 449 | 0.8770 |
| 13 | 2 | 526 | 1.0273 |
| 14 | 2 | 602 | 1.1758 |
| 15 | 4 | 340 | 1.3281 |
| 16 | 4 | 378 | 1.4766 |
| 17 | 4 | 434 | 1.6953 |
| 18 | 4 | 490 | 1.9141 |
| 19 | 4 | 553 | 2.1602 |
| 20 | 4 | 616 | 2.4063 |
| 21 | 6 | 438 | 2.5664 |
| 22 | 6 | 466 | 2.7305 |
| 23 | 6 | 517 | 3.0293 |
| 24 | 6 | 567 | 3.3223 |
| 25 | 6 | 616 | 3.6094 |
| 26 | 6 | 666 | 3.9023 |
| 27 | 6 | 719 | 4.2129 |
| 28 | 6 | 772 | 4.5234 |
| 29 | 2 | reserved | |
| 30 | 4 | reserved | |
| 31 | 6 | reserved | |

Variant-2

| MCS Index | Modulation Order | Target code Rate × [1024] | Spectral efficiency |
|---|---|---|---|
| 0 | 2 | 30 | 0.0586 |
| 1 | 2 | 41 | 0.0801 |
| 2 | 2 | 52 | 0.1016 |
| 3 | 2 | 65 | 0.1270 |

Variant-3

| MCS Index | Modulation Order | Target code Rate × [1024] | Spectral efficiency |
|---|---|---|---|
| 0 | 2 | 30 | 0.0586 |
| 1 | 2 | 42 | 0.0820 |
| 2 | 2 | 54 | 0.1055 |
| 3 | 2 | 66 | 0.1289 |

Variant-4

| MCS Index | Modulation Order | Target code Rate × [1024] | Spectral efficiency |
|---|---|---|---|
| 0 | 2 | 30 | 0.0586 |
| 1 | 2 | 43 | 0.0840 |
| 2 | 2 | 56 | 0.1094 |
| 3 | 2 | 67 | 0.1309 |

Variant-5

| MCS Index | Modulation Order | Target code Rate × [1024] | Spectral efficiency |
|---|---|---|---|
| 0 | 2 | 32 | 0.0625 |
| 1 | 2 | 41 | 0.0801 |
| 2 | 2 | 50 | 0.0977 |
| 3 | 2 | 64 | 0.1250 |

Variant-6

| MCS Index | Modulation Order | Target code Rate × [1024] | Spectral efficiency |
|---|---|---|---|
| 0 | 2 | 32 | 0.0625 |
| 1 | 2 | 42 | 0.0820 |
| 2 | 2 | 52 | 0.1016 |
| 3 | 2 | 65 | 0.1270 |

Variant-7

| MCS Index | Modulation Order | Target code Rate × [1024] | Spectral efficiency |
|---|---|---|---|
| 0 | 2 | 32 | 0.0625 |
| 1 | 2 | 43 | 0.0840 |
| 2 | 2 | 54 | 0.1055 |
| 3 | 2 | 66 | 0.1289 |

Variant-8

| MCS Index | Modulation Order | Target code Rate × [1024] | Spectral efficiency |
|---|---|---|---|
| 0 | 2 | 32 | 0.0625 |
| 1 | 2 | 44 | 0.0859 |
| 2 | 2 | 56 | 0.1094 |
| 3 | 2 | 67 | 0.1309 |

Variant-9

| MCS Index | Modulation Order | Target code Rate × [1024] | Spectral efficiency |
|---|---|---|---|
| 0 | 2 | 34 | 0.0664 |
| 1 | 2 | 42 | 0.0820 |
| 2 | 2 | 50 | 0.0977 |
| 3 | 2 | 64 | 0.1250 |

Variant-10

| MCS Index | Modulation Order | Target code Rate × [1024] | Spectral efficiency |
|---|---|---|---|
| 0 | 2 | 34 | 0.0664 |
| 1 | 2 | 43 | 0.0840 |
| 2 | 2 | 52 | 0.1016 |
| 3 | 2 | 65 | 0.1270 |

Variant-11

| MCS Index | Modulation Order | Target code Rate × [1024] | Spectral efficiency |
|---|---|---|---|
| 0 | 2 | 34 | 0.0664 |
| 1 | 2 | 44 | 0.0860 |
| 2 | 2 | 54 | 0.1055 |
| 3 | 2 | 66 | 0.1289 |

Variant-12

| MCS Index | Modulation Order | Target code Rate × [1024] | Spectral efficiency |
|---|---|---|---|
| 0 | 2 | 34 | 0.0664 |
| 1 | 2 | 45 | 0.0879 |
| 2 | 2 | 56 | 0.1094 |
| 3 | 2 | 67 | 0.1309 |

Variant-13

| MCS Index | Modulation Order | Target code Rate × [1024] | Spectral efficiency |
|---|---|---|---|
| 0 | 2 | 31 | 0.0605 |
| 1 | 2 | 40 or 40.5 or 41 | 0.0781 or 0.0791 or 0.0801 |
| 2 | 2 | 50 | 0.0977 |
| 3 | 2 | 64 | 0.1250 |

Variant-14

| MCS Index | Modulation Order | Target code Rate × [1024] | Spectral efficiency |
|---|---|---|---|
| 0 | 2 | 31 | 0.0605 |
| 1 | 2 | 41 | 0.0801 |
| 2 | 2 | 51 | 0.0996 |
| 3 | 2 | 64 or 64.5 or 65 | 0.1250 or 0.126 or 0.127 |

Variant-15

| MCS Index | Modulation Order | Target code Rate × [1024] | Spectral efficiency |
|---|---|---|---|
| 0 | 2 | 31 | 0.0605 |
| 1 | 2 | 41 or 41.5 or 42 | 0.0801 or 0.0811 or 0.082 |
| 2 | 2 | 52 | 0.1016 |
| 3 | 2 | 65 | 0.127 |

Variant-16

| MCS Index | Modulation Order | Target code Rate × [1024] | Spectral efficiency |
|---|---|---|---|
| 0 | 2 | 31 | 0.0605 |
| 1 | 2 | 42 | 0.082 |
| 2 | 2 | 53 | 0.1035 |
| 3 | 2 | 65 or 65.5 or 66 | 0.127 or 0.1279 or .1289 |

Variant-17

| MCS Index | Modulation Order | Target code Rate × [1024] | Spectral efficiency |
|---|---|---|---|
| 0 | 2 | 32 | 0.0625 |
| 1 | 2 | 41 or 41.5 or 42 | 0.0801 or 0.0811 or 0.082 |
| 2 | 2 | 51 | 0.0996 |
| 3 | 2 | 64 or 64.5 or 65 | 0.1250 or 0.126 or 0.127 |

Variant-18

| MCS Index | Modulation Order | Target code Rate × [1024] | Spectral efficiency |
|---|---|---|---|
| 0 | 2 | 32 | 0.0625 |
| 1 | 2 | 42 or 42.5 or 43 | 0.082 or 0.083 or .084 |
| 2 | 2 | 53 | 0.1035 |
| 3 | 2 | 65 or 65.5 or 66 | 0.127 or 0.1279 or 0.1289 |

(2) Next, we consider MCS table construction based CQI candidate table 2 in Option 1, where MCS index 0 maps to CQI 2, i.e., MCS table does not start from the minimum SE point of the CQI table. This may provide the benefit of reaching higher SE point in the MCS table. Rest of the entries are obtained similarly as outlined in MCS tables 2a-1, 2b, e.g., either taken from CQI table or interpolated between consecutive CQI entries or extrapolated from a CQI entry. To this end, constructed MCS table in this fashion may have similar SE range as in MCS tables 1a-1, 1a-2, 1b. MCS index 0 can take any candidate value of CQI index 1, identified in Table 1 in Option 1 above, e.g., CR×1024 can be one value from 45 to 60.

MCS index 2 will correspond to CR*1024=78, i.e., CQI 2 in Table 1 in Option 1 or CQI 3 in Table 2 in Option 1. Hence, CR*1024 of MCS index 1 will be interpolated from CR*1024 of MCS index 0 and 2. Some examples are provided below for MCS indices 0 and 1. MCS indices 2 to 31 can have the same values as identified in MCS tables 1a-1 or 1a-2 or 1b presented above.

Variant-1

| MCS Index | Modulation Order | Target code Rate × [1024] | Spectral efficiency |
|---|---|---|---|
| 0 | 2 | 50 | 0.0977 |
| 1 | 2 | 64 | 0.125 |

Variant-2

| MCS Index | Modulation Order | Target code Rate × [1024] | Spectral efficiency |
|---|---|---|---|
| 0 | 2 | 51 | 0.0996 |
| 1 | 2 | 64 or 64.5 or 65 | 0.1250 or 0.126 or 0.127 |

Variant-3

| MCS Index | Modulation Order | Target code Rate × [1024] | Spectral efficiency |
|---|---|---|---|
| 0 | 2 | 52 | 0.1016 |
| 1 | 2 | 65 | 0.127 |

Variant-4

| MCS Index | Modulation Order | Target code Rate × [1024] | Spectral efficiency |
|---|---|---|---|
| 0 | 2 | 53 | 0.1035 |
| 1 | 2 | 65 or 65.5 or 66 | 0.127 or 0.1279 or 0.1289 |

| MCS Index | Modulation Order | Target code Rate × [1024] | Spectral efficiency |
|---|---|---|---|
| 0 | 2 | 54 | 0.1055 |
| 1 | 2 | 66 | 0.1289 |

Variant-6

| MCS Index | Modulation Order | Target code Rate × [1024] | Spectral efficiency |
|---|---|---|---|
| 0 | 2 | 55 | 0.1074 |
| 1 | 2 | 66 or 66.5 or 67 | 0.1289 or 0.1299 or .1309 |

A detailed example in this category is provided below:

| MCS Index | Modulation Order | Target code Rate × [1024] | Spectral efficiency |
|---|---|---|---|
| 0 | 2 | 50 | 0.0977 |
| 1 | 2 | 64 | 0.1250 |
| 2 | 2 | 78 | 0.1523 |
| 3 | 2 | 99 | 0.1934 |
| 4 | 2 | 120 | 0.2344 |
| 5 | 2 | 157 | 0.3066 |
| 6 | 2 | 193 | 0.3770 |
| 7 | 2 | 251 | 0.4902 |
| 8 | 2 | 308 | 0.6016 |
| 9 | 2 | 379 | 0.7402 |
| 10 | 2 | 449 | 0.8770 |
| 11 | 2 | 526 | 1.0273 |
| 12 | 2 | 602 | 1.1758 |
| 13 | 2 | 679 | 1.3262 |
| 14 | 4 | 340 | 1.3281 |
| 15 | 4 | 378 | 1.4766 |
| 16 | 4 | 434 | 1.6953 |
| 17 | 4 | 490 | 1.9141 |
| 18 | 4 | 553 | 2.1602 |
| 19 | 4 | 616 | 2.4063 |
| 20 | 4 | 658 | 2.5703 |
| 21 | 6 | 438 | 2.5664 |
| 22 | 6 | 466 | 2.7305 |
| 23 | 6 | 517 | 3.0293 |
| 24 | 6 | 567 | 3.3223 |
| 25 | 6 | 616 | 3.6094 |
| 26 | 6 | 666 | 3.9023 |
| 27 | 6 | 719 | 4.2129 |
| 28 | 6 | 772 | 4.5234 |
| 29 | 2 | reserved | |
| 30 | 4 | reserved | |
| 31 | 6 | reserved | |

MCS Tables for UL DFT-S OFDM Transmission

In the aspects mentioned above, MCS tables for cyclic prefix (CP) OFDM transmission were discussed. CP-OFDM transmission can be made in both UL and DL. However, in UL, in some cases, DFT-s OFDM or transform precoding-based transmission maybe preferred.

A legacy MCS table with modulation order up to 64QAM for UL transform precoding-based transmission is as follows:

| MCS Index $I_{MCS}$ | Modulation Order $Q_m$ | Target code Rate R × 1024 | Spectral efficiency |
|---|---|---|---|
| 0 | q | 240/q | 0.2344 |
| 1 | q | 314/q | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |
| 17 | 6 | 466 | 2.7305 |
| 18 | 6 | 517 | 3.0293 |
| 19 | 6 | 567 | 3.3223 |
| 20 | 6 | 616 | 3.6094 |
| 21 | 6 | 666 | 3.9023 |
| 22 | 6 | 719 | 4.2129 |
| 23 | 6 | 772 | 4.5234 |
| 24 | 6 | 822 | 4.8164 |
| 25 | 6 | 873 | 5.1152 |
| 26 | 6 | 910 | 5.3320 |
| 27 | 6 | 948 | 5.5547 |
| 28 | 1 | reserved | |
| 29 | 2 | reserved | |
| 30 | 4 | reserved | |
| 31 | 6 | reserved | |

In some aspects, new MCS tables as disclosed herein can be used for transform precoding-based UL transmission in view of the proposed MCS tables above. Here, q=1 if UE has reported supporting pi/2 BPSK modulation; and q=2 in other cases.

Example 1

MCS Table keeps minimum SE point of CQI table as discussed in Table 2 in Option 1. An example table is as follows:

| MCS Index | Modulation Order | Target code Rate × [1024] | Spectral efficiency |
|---|---|---|---|
| 0 | q | 60/q | 0.0586 |
| 1 | q | 82/q | 0.0801 |
| 2 | 2 or q | 52 or 104/q | 0.1016 |
| 3 | 2 or q | 65 or 130/q | 0.1270 |
| 4 | 2 | 78 | 0.1523 |
| 5 | 2 | 99 | 0.1934 |
| 6 | 2 | 120 | 0.2344 |
| 7 | 2 | 157 | 0.3066 |
| 8 | 2 | 193 | 0.3770 |
| 9 | 2 | 251 | 0.4902 |
| 10 | 2 | 308 | 0.6016 |
| 11 | 2 | 379 | 0.7402 |
| 12 | 2 | 449 | 0.8770 |
| 13 | 2 | 526 | 1.0273 |
| 14 | 2 | 602 | 1.1758 |
| 15 | 2 | 679 | 1.3262 |
| 16 | 4 | 340 | 1.3281 |
| 17 | 4 | 378 | 1.4766 |
| 18 | 4 | 434 | 1.6953 |
| 19 | 4 | 490 | 1.9141 |
| 20 | 4 | 553 | 2.1602 |
| 21 | 4 | 616 | 2.4063 |
| 22 | 4 | 658 | 2.5703 |
| 23 | 6 | 466 | 2.7305 |
| 24 | 6 | 517 | 3.0293 |
| 25 | 6 | 567 | 3.3223 |
| 26 | 6 | 616 | 3.6094 |
| 27 | 6 | 666 | 3.9023 |
| 28 | 1 | | reserved |
| 29 | 2 | | reserved |
| 30 | 4 | | reserved |
| 31 | 6 | | reserved |

Note that in a similar manner, MCS table for transform precoding-based transmission can be obtained for other choices of values in MCS indices 0 to 4, i.e., depending on CQI1 and 2 entries, of the variants 1-17 discussed above. MCS indices 4 to 31 can be as shown in example 1 above. MCS table entries 0 to 4 corresponding to some of the variants discussed above are shown as follows. In one aspect, for MCS indices 0 and 1, modulation order is q and corresponding code rate*1024 is twice the value shown for code rate*1024 in the variants discussed above, divided by q. For MCS indices 2 and 3, modulation order and code rate values can be same as shown in the variants above or modulation order can be q and corresponding code rate*1024 is twice the value shown for code rate*1024 in the variants for corresponding indices:

Variant-1

| MCS Index | Modulation Order | Target code Rate × [1024] | Spectral efficiency |
|---|---|---|---|
| 0 | q | 60/q | 0.0586 |
| 1 | q | 80/q | 0.0781 |
| 2 | 2 or q | 50 or 100/q | 0.0977 |
| 3 | 2 or q | 64 or 128/q | 0.1250 |

Variant-2

| MCS Index | Modulation Order | Target code Rate × [1024] | Spectral efficiency |
|---|---|---|---|
| 0 | q | 60/q | 0.0586 |
| 1 | q | 84/q | 0.0820 |
| 2 | 2 or q | 54 or 108/q | 0.1055 |
| 3 | 2 or q | 66 or 132/q | 0.1289 |

Variant-3

| MCS Index | Modulation Order | Target code Rate × [1024] | Spectral efficiency |
|---|---|---|---|
| 0 | q | 64/q | 0.0625 |
| 1 | q | 82/q | 0.0801 |
| 2 | 2 or q | 50 or 100/q | 0.0977 |
| 3 | 2 or q | 64 or 128/q | 0.1250 |

Variant-4

| MCS Index | Modulation Order | Target code Rate × [1024] | Spectral efficiency |
|---|---|---|---|
| 0 | q | 64/q | 0.0625 |
| 1 | q | 84/q | 0.0820 |
| 2 | 2 or q | 52 or 104/q | 0.1016 |
| 3 | 2 or q | 65 or 130/q | 0.1270 |

Variant-5

| MCS Index | Modulation Order | Target code Rate × [1024] | Spectral efficiency |
|---|---|---|---|
| 0 | q | 64/q | 0.0625 |
| 1 | q | 86/q | 0.0840 |
| 2 | 2 or q | 54 or 108/q | 0.1055 |
| 3 | 2 or q | 66 or 132/q | 0.1289 |

Example 2

MCS Table minimum SE point maps to CQI index 2 in the CQI table as discussed in Table 2 in Option 1 or CQI index 1 in the CQI table as presented in Table 1 in Option1. An example MCS table with such properties is as follows:

| MCS Index | Modulation Order | Target code Rate × [1024] | Spectral efficiency |
|---|---|---|---|
| 0 | q | 100/q | 0.0977 |
| 1 | q | 128/q | 0.1250 |
| 2 | 2 or q | 78 or 156/q | 0.1523 |
| 3 | 2 or q | 99 or 198/q | 0.1934 |
| 4 | 2 | 120 | 0.2344 |
| 5 | 2 | 157 | 0.3066 |
| 6 | 2 | 193 | 0.3770 |
| 7 | 2 | 251 | 0.4902 |
| 8 | 2 | 308 | 0.6016 |
| 9 | 2 | 379 | 0.7402 |
| 10 | 2 | 449 | 0.8770 |
| 11 | 2 | 526 | 1.0273 |
| 12 | 2 | 602 | 1.1758 |
| 13 | 2 | 679 | 1.3262 |
| 14 | 4 | 340 | 1.3281 |
| 15 | 4 | 378 | 1.4766 |
| 16 | 4 | 434 | 1.6953 |
| 17 | 4 | 490 | 1.9141 |
| 18 | 4 | 553 | 2.1602 |
| 19 | 4 | 616 | 2.4063 |
| 20 | 4 | 658 | 2.5703 |
| 21 | 6 | 466 | 2.7305 |
| 22 | 6 | 517 | 3.0293 |
| 23 | 6 | 567 | 3.3223 |

-continued

| MCS Index | Modulation Order | Target code Rate × [1024] | Spectral efficiency |
|---|---|---|---|
| 24 | 6 | 616 | 3.6094 |
| 25 | 6 | 666 | 3.9023 |
| 26 | 6 | 719 | 4.2129 |
| 27 | 6 | 772 | 4.5234 |
| 28 | 1 | reserved | |
| 29 | 2 | reserved | |
| 30 | 4 | reserved | |
| 31 | 6 | reserved | |

In some aspects, in a similar manner, MCS table for transform precoding-based transmission can be obtained for other choices of values in MCS indices 0 to 1, i.e., depending on CQI 1 entry in Table 1 in Option 1 or CQI 2 entry in Table 2 in Option 1. MCS indices 2 to 31 can be as shown in example 2 above. MCS table entries 0 to 1 corresponding to some of the examples (a-f) discussed above are shown as follows. In one aspect, for MCS indices 0 and 1, modulation order is q and corresponding code rate*1024 is twice the value shown for code rate*1024 in the examples (a-f) discussed to above, divided by q.

Variant-1

| MCS Index | Modulation Order | Target code Rate × [1024] | Spectral efficiency |
|---|---|---|---|
| 0 | q | 100/q | 0.0977 |
| 1 | q | 128/q | 0.125 |

Variant-2

| MCS Index | Modulation Order | Target code Rate × [1024] | Spectral efficiency |
|---|---|---|---|
| 0 | q | 104/q | 0.1016 |
| 1 | q | 130/q | 0.127 |

Variant-3

| MCS Index | Modulation Order | Target code Rate × [1024] | Spectral efficiency |
|---|---|---|---|
| 0 | q | 108/q | 0.1055 |
| 1 | q | 132/q | 0.1289 |

In some aspects, a method for new radio (NR) communications includes receiving by a UE, a first configuration message, the configuration message comprises a BLER target and CQI table for CSI feedback; receiving by the UE, a second configuration message, the configuration message indicates an MCS table for use in downlink scheduled transmission (PDSCH): subsequently, receiving by the UE, a downlink scheduled transmission (PDSCH).

In some aspects, the first and second configuration messages are indicated to the UE by UE-specific RRC signaling.

In some aspects, the second configuration message is indicated to the UE in a field as part of the PDSCH configuration information element.

In some aspects, the indicated MCS table and CQI table have the same minimum spectral efficiency point.

In some aspects, the indicated MCS table and CQI table have the same maximum spectral efficiency point.

In some aspects, the indicated MCS table has a maximum modulation scheme of 64QAM.

In some aspects, the indicated MCS table has 32 entries where all entries are used for explicit modulation order and coding rate indication.

In some aspects, receiving by the UE, a third configuration message, the configuration message indicates an MCS table for use in uplink scheduled transmission (PUSCH).

In some aspects, MCS tables indicated by second and third configuration messages have different spectral efficiency range.

In some aspects, the third configuration message is conveyed to the UE by UE specific RRC signaling.

In some aspects, the indication is transmitted as part of PUSCH-configuration information element.

In some aspects, the first and second configuration messages are indicated to the UE by UE-specific RRC signaling, on a per-BWP basis, i.e., UE-specific BWP-specific RRC signaling.

In some aspects, a first UE-specific BWP-specific configuration of MCS table is received via a first PDSCH configuration associated with a first BWP configured for the UE.

In some aspects, a second UE-specific BWP-specific configuration of MCS table is received via a second PDSCH configuration associated with a second BWP configured for the UE.

In some aspects, L1 or RRC signaling indicates BWP switching.

In some aspects, UE is indicated which MCS table to consider from supported candidate MCS tables, as part of the PDSCH configuration on the active BWP.

In some aspects, the indication of which MCS table, is configured as part of the PDSCH configuration set and a switching mechanism between the two MCS tables is enabled through different BWPs.

In some aspects, different PDSCH configurations are realized by configuring exact same BWPs in terms of BW, SCS, and center carrier frequency.

In some aspects, different PDSCH configurations are realized through configuring different BWPs, e.g., in terms of SCS.

In some aspects, if multiple active BWPs are supported for a UE, DCI-based indication of the MCS table is considered.

Figure 6:
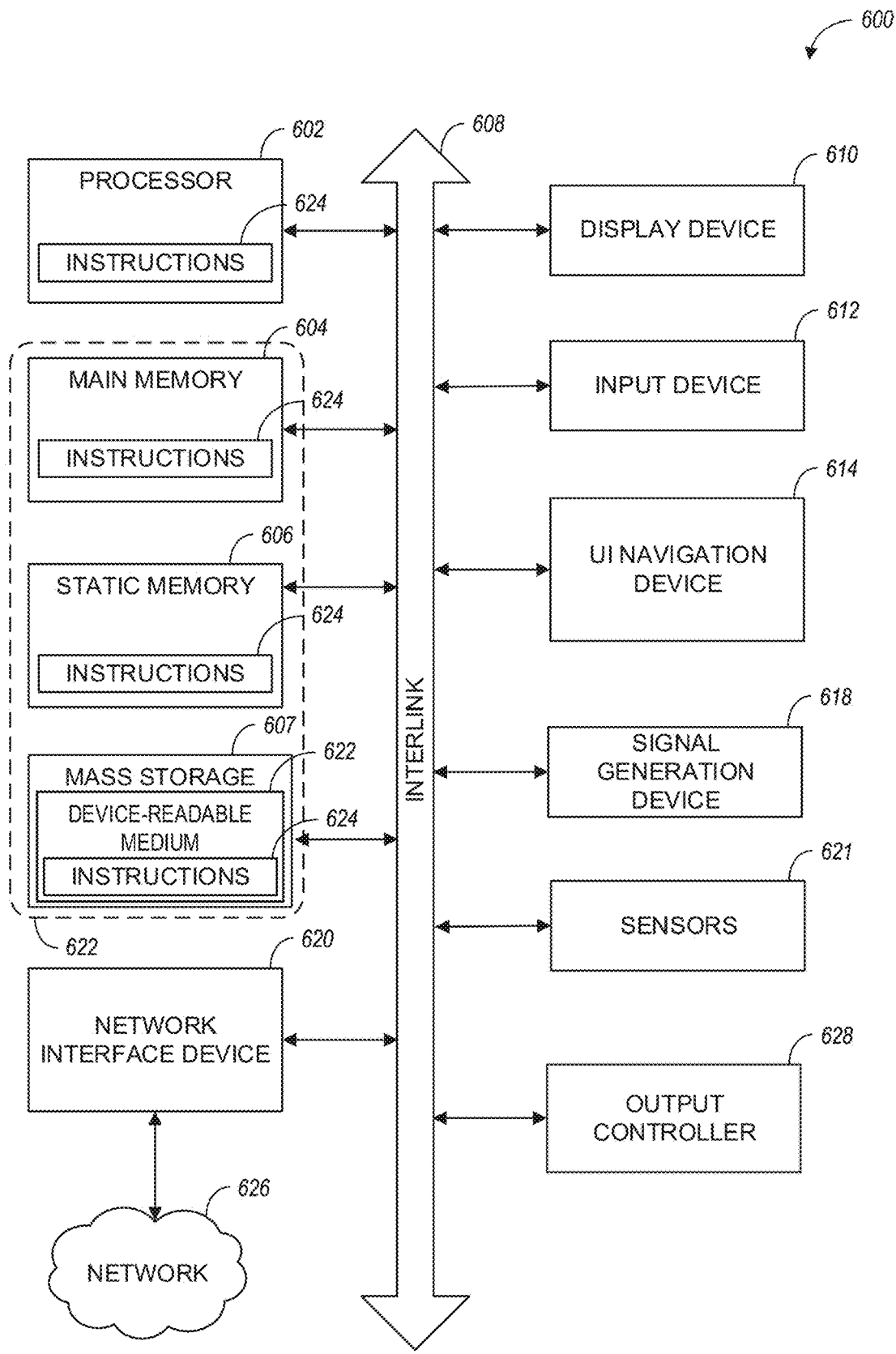
FIG. 6 illustrates a block diagram of a communication device such as an evolved Node-B (eNB), a new generation Node-B (gNB), an access point (AP), a wireless station (STA), a mobile station (MS), or a user equipment (UE), in accordance with some aspects.

FIG. 6 illustrates a block diagram of a communication device such as an evolved Node-B (eNB), a next generation Node-B (gNB), an access point (AP), a wireless station (STA), a mobile station (MS), or a user equipment (UE), in accordance with some aspects and to perform one or more of the techniques disclosed herein. In alternative aspects, the communication device 600 may operate as a standalone device or may be connected (e.g., networked) to other communication devices.

Circuitry (e.g., processing circuitry) is a collection of circuits implemented intangible entities of the device 600 that include hardware (e.g., simple circuits, gates, logic, etc.). Circuitry membership may be flexible over time. Circuitries include members that may, alone or in combination, perform specified operations when operating. In an example, the hardware of the circuitry may be immutably designed to carry out a specific operation (e.g., hardwired). In an example, the hardware of the circuitry may include variably connected physical components (e.g., execution units, transistors, simple circuits, etc.) including a machine-readable medium physically modified (e.g., magnetically, electrically, moveable placement of invariant massed particles, etc.) to encode instructions of the specific operation.

In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the device 600 follow.

In some aspects, the device 600 may operate as a stand-alone device or may be connected (e.g., networked) to other devices. In a networked deployment, the communication device 600 may operate in the capacity of a server communication device, a client communication device, or both in server-client network environments. In an example, the communication device 600 may act as a peer communication device in peer-to-peer (P2P) (or other distributed) network environment. The communication device 600 may be a UE, eNB, PC, a tablet PC, a STB, a PDA, a mobile telephone, a smartphone, a web appliance, a network router, switch or bridge, or any communication device capable of executing instructions (sequential or otherwise) that specify actions to be taken by that communication device. Further, while only a single communication device is illustrated, the term "communication device" shall also be taken to include any collection of communication devices that individually or jointly execute a set (or multiple sets) of instructions to perform any one or more of the methodologies discussed herein, such as cloud computing, software as a service (SaaS), and other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a communication device-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. The software may accordingly configure a hardware processor, for example, to constitute a particular module at one instance of time and to constitute a different module at a different instance of time.

Communication device (e.g., UE) 600 may include a hardware processor 602 (e.g., a central processing unit (CPU), a graphics processing unit (GPU), a hardware processor core, or any combination thereof), a main memory 604, a static memory 606, and mass storage 607 (e.g., hard drive, tape drive, flash storage, or other block or storage devices), some or all of which may communicate with each other via an interlink (e.g., bus) 608.

The communication device 600 may further include a display device 610, an alphanumeric input device 612 (e.g., a keyboard), and a user interface (UI) navigation device 614 (e.g., a mouse). In an example, the display device 610, input device 612 and UI navigation device 614 may be a touch-screen display. The communication device 600 may additionally include a signal generation device 618 (e.g., a speaker), a network interface device 620, and one or more sensors 621, such as a global positioning system (GPS) sensor, compass, accelerometer, or another sensor. The communication device 600 may include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 607 may include a communication device-readable medium 622, on which is stored one or more sets of data structures or instructions 624 (e.g., software) embodying or utilized by any one or more of the techniques or functions described herein. In some aspects, registers of the processor 602, the main memory 604, the static memory 606, and/or the mass storage 607 may be, or include (completely or at least partially), the device-readable medium 622, on which is stored the one or more sets of data structures or instructions 624, embodying or utilized by any one or more of the techniques or functions described herein. In an example, one or any combination of the hardware processor 602, the main memory 604, the static memory 606, or the mass storage 616 may constitute the device-readable medium 622.

As used herein, the term "device-readable medium" is interchangeable with "computer-readable medium" or "machine-readable medium". While the communication device-readable medium 622 is illustrated as a single medium, the term "communication device-readable medium" may include a single medium or multiple media (e.g., a centralized or distributed database, and/or associated caches and servers) configured to store the one or more instructions 624.

The term "communication device-readable medium" is inclusive of the terms "machine-readable medium" or "computer-readable medium", and may include any medium that is capable of storing, encoding, or carrying instructions (e.g., instructions 624) for execution by the communication device 600 and that cause the communication device 600 to perform any one or more of the techniques of the present disclosure, or that is capable of storing, encoding or carrying data structures used by or associated with such instructions. Non-limiting communication device-readable medium examples may include solid-state memories and optical and magnetic media. Specific examples of communication device-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM): and CD-ROM and DVD-ROM disks. In some examples, communication device-readable media may include non-transitory communication device-readable media. In some examples, communication device-readable media may include communication device-readable media that is not a transitory propagating signal.

The instructions 624 may further be transmitted or received over a communications network 626 using a transmission medium via the network interface device 620 utilizing any one of a number of transfer protocols. In an example, the network interface device 620 may include one or more physical jacks (e.g., Ethernet, coaxial, or phone jacks) or one or more antennas to connect to the communications network 626. In an example, the network interface device 620 may include a plurality of antennas to wirelessly communicate using at least one of single-input-multiple-output (SIMO), MIMO, or multiple-input-single-output (MISO) techniques. In some examples, the network interface device 620 may wirelessly communicate using Multiple User MIMO techniques.

The term "transmission medium" shall be taken to include any intangible medium that is capable of storing, encoding or carrying instructions for execution by the communication device 600, and includes digital or analog communications signals or another intangible medium to facilitate communication of such software. In this regard, a transmission medium in the context of this disclosure is a device-readable medium.

A communication device-readable medium may be provided by a storage device or other apparatus which is capable of hosting data in a non-transitory format. In an example, information stored or otherwise provided on a communication device-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the communication device-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable etc.) at a local machine, and executed by the local machine.

Although an aspect has been described with reference to specific exemplary aspects, it will be evident that various modifications and changes may be made to these aspects without departing from the broader scope of the present disclosure. Accordingly, the specification and drawings are to be regarded in an illustrative rather than a restrictive sense. This Detailed Description, therefore, is not to be taken in a limiting sense, and the scope of various aspects is defined only by the appended claims, along with the full range of equivalents to which such claims are entitled.

What is claimed is:

1. An apparatus, comprising: a processor configured to cause a user equipment (UE) to:
decode first RRC configuration information received from a base station, the first RRC configuration information including a channel quality indicator (CQI) table indication identifying a CQI table;
decode second RRC configuration information, the second RRC configuration information including a modulation coding scheme (MCS) table indication identifying an MCS table, the identified MCS table comprising one of a first MCS table and a second MCS table;
encode channel state information (CSI), the CSI including a CQI index associated with the CQI table, the CQI index for MCS selection by the base station;
decode downlink control information (DCI) received via a physical downlink control channel (PDCCH), the DCI providing a downlink (DL) grant for a physical downlink shared channel (PDSCH) reception and an MCS index to the MCS table;
select a target code rate (TCR) using the identified MCS table based on the MCS index, wherein if the first MCS table is identified, a higher TCR is selected based on the MCS index than it the second MCS table is identified, wherein the second MCS table includes the following modulation order and target code rate for MCS index values of 0-5:

| MCS Index $I_{MCS}$ | Modulation Order $Q_m$ | Target code Rate R × [1024] | Spectral efficiency |
|---|---|---|---|
| 0 | 2 | 30 | 0.0586 |
| 1 | 2 | 40 | 0.0781 |
| 2 | 2 | 50 | 0.0977 |
| 3 | 2 | 64 | 0.1250 |
| 4 | 2 | 78 | 0.1523 |
| 5 | 2 | 99 | 0.1934 | and
decode the PDSCH based on the DL grant and using modulation order and target code rate corresponding to the MCS index to the MCS table.

2. The apparatus of claim 1, wherein the processor is further configured to cause the UE to: determine the CQI index for reporting as part of the CSI based on the CQI table indication and a transport block error probability associated with the CQI table.

3. The apparatus of claim 2, wherein the processor is further configured to cause the UE to: determine the transport block error probability is 0.1 or 0.00001 and is determined based on the CQI table indication.

4. The apparatus of claim 1, wherein the CQI table is as follows:

| CQI index | modulation | code rate × 1024 | efficiency |
|---|---|---|---|
| 0 | | out of range | |
| 1 | QPSK | 30 | 0.0586 |
| 2 | QPSK | 50 | 0.0977 |
| 3 | QPSK | 78 | 0.1523 |
| 4 | QPSK | 120 | 0.2344 |
| 5 | QPSK | 193 | 0.3770 |
| 6 | QPSK | 308 | 0.6016 |
| 7 | QPSK | 449 | 0.8770 |
| 8 | QPSK | 602 | 1.1758 |
| 9 | 16QAM | 378 | 1.4766 |
| 10 | 16QAM | 490 | 1.9141 |
| 11 | 16QAM | 616 | 2.4063 |
| 12 | 64QAM | 466 | 2.7305 |
| 13 | 64QAM | 567 | 3.3223 |
| 14 | 64QAM | 666 | 3.9023 |
| 15 | 64QAM | 772 | 4.5234 |

5. The apparatus of claim 1, wherein the MCS table indication is an mcs-Table parameter communicated via the second RRC configuration information.

6. The apparatus of claim 1, wherein the processor is further configured to cause the UE to: decode a third RRC configuration information, the third RRC configuration information including an MCS table indication identifying an MCS table for uplink communications.

7. The apparatus of claim 6, wherein the MCS table for the uplink communications includes the following modulation order and target code rate for MCS index values of 0-3, when the uplink communications use Discrete Fourier Transform (DFT) spread Orthogonal Frequency Division Multiplexing (OFDM) (DFT-s-OFDM) or transform precoding:

| MCS Index $I_{MCS}$ | Modulation Order $Q_m$ | Target code Rate R × 1024 | Spectral efficiency |
|---|---|---|---|
| 0 | q | 60/q | 0.0586 |
| 1 | q | 80/q | 0.0781 |
| 2 | q | 100/q | 0.0977 |
| 3 | q | 128/q | 0.1250 |

8. The apparatus of claim 6, wherein the MCS table for the uplink communications includes the following modulation order and target code rate for MCS index values 0-5, when the uplink communications use Cyclic Prefix Orthogonal Frequency Division Multiplexing (CP-OFDM):

| MCS Index $I_{MCS}$ | Modulation Order $Q_m$ | Target code Rate R × [1024] | Spectral efficiency |
|---|---|---|---|
| 0 | 2 | 30 | 0.0586 |
| 1 | 2 | 40 | 0.0781 |
| 2 | 2 | 50 | 0.0977 |
| 3 | 2 | 64 | 0.1250 |
| 4 | 2 | 78 | 0.1523 |
| 5 | 2 | 99 | 0.1934 |

9. The apparatus of claim 1, further comprising transceiver circuitry coupled to the processor; and, one or more antennas coupled to the transceiver circuitry.

10. A non-transitory computer-readable storage medium that stores instructions for execution by one or more processors of a base station (BS) operating in a 5G network, the instructions to configure the one or more processors for New Radio (NR) communications and to cause the BS to:
encode a first radio resource control (RRC) configuration information for transmission to a user equipment (UE), the first RRC configuration information including a channel quality indicator (CQI) table indication identifying a CQI table;
encode a second RRC configuration information for transmission to the UE, the second RRC configuration information including a modulation and coding scheme (MCS) table indication identifying an MCS table, the identified MCS table comprising one of a first MCS table and a second MCS table;
provide scheduling including a downlink (DL) grant using the identified MCS table, wherein if the first MCS table is identified, a higher target code rate (TCR) corresponds to an MCS index than if the second MCS table is identified, wherein the second MCS table includes the following modulation order and target code rate for MCS index values of 0-5:

| MCS Index $I_{MCS}$ | Modulation Order $Q_m$ | Target code Rate R × [1024] | Spectral efficiency |
|---|---|---|---|
| 0 | 2 | 30 | 0.0586 |
| 1 | 2 | 40 | 0.0781 |
| 2 | 2 | 50 | 0.0977 |
| 3 | 2 | 64 | 0.1250 |
| 4 | 2 | 78 | 0.1523 |
| 5 | 2 | 99 | 0.1934 | and encode DL information for transmission via a physical downlink shared channel (PDSCH) using the MCS table.

11. The non-transitory computer-readable storage medium of claim 10, wherein the CQI table is as follows:

| CQI index | modulation | code rate × 1024 | efficiency |
|---|---|---|---|
| 0 | | out of range | |
| 1 | QPSK | 30 | 0.0586 |
| 2 | QPSK | 50 | 0.0977 |
| 3 | QPSK | 78 | 0.1523 |
| 4 | QPSK | 120 | 0.2344 |
| 5 | QPSK | 193 | 0.3770 |
| 6 | QPSK | 308 | 0.6016 |
| 7 | QPSK | 449 | 0.8770 |
| 8 | QPSK | 602 | 1.1758 |
| 9 | 16QAM | 378 | 1.4766 |
| 10 | 16QAM | 490 | 1.9141 |
| 11 | 16QAM | 616 | 2.4063 |
| 12 | 64QAM | 466 | 2.7305 |
| 13 | 64QAM | 567 | 3.3223 |
| 14 | 64QAM | 666 | 3.9023 |
| 15 | 64QAM | 772 | 4.5234 |

12. The non-transitory computer-readable storage medium of claim 10, wherein the instructions further cause the BS to:
encode a third RRC signaling, the third RRC signaling including an MCS table indication identifying an MCS table for uplink communications.

13. The non-transitory computer-readable storage medium of claim 12, wherein the MCS table for the uplink communications includes the following modulation order and target code rate for MCS index values of 0-3, when the uplink communications use Discrete Fourier Transform (DFT) spread Orthogonal Frequency Division Multiplexing (OFDM) (DFT-s-OFDM) or transform precoding:

| MCS Index $I_{MCS}$ | Modulation Order $Q_m$ | Target code Rate R × 1024 | Spectral efficiency |
|---|---|---|---|
| 0 | q | 60/q | 0.0586 |
| 1 | q | 80/q | 0.0781 |
| 2 | q | 100/q | 0.0977 |
| 3 | q | 128/q | 0.1250 |

14. The non-transitory computer-readable storage medium of claim 10, wherein the MCS table indication is an arcs-Table parameter communicated via the second RRC signaling.

15. The non-transitory computer-readable storage medium of claim 10, wherein the instructions cause the BS to: encode a third RRC configuration information, the third RRC configuration information including an MCS table indication identifying an MCS table for uplink communications.

16. The non-transitory computer-readable storage medium of claim 15, wherein the MCS table for the uplink communications includes the following modulation order and target code rate for MCS index values of 0-3, when the uplink communications use Discrete Fourier Transform (DFT) spread Orthogonal Frequency Division Multiplexing (OFDM) (DFT-s-OFDM) or transform precoding:

| MCS Index $I_{MCS}$ | Modulation Order $Q_m$ | Target code Rate R × 1024 | Spectral efficiency |
|---|---|---|---|
| 0 | q | 60/q | 0.0586 |
| 1 | q | 80/q | 0.0781 |
| 2 | q | 100/q | 0.0977 |
| 3 | q | 128/q | 0.1250. |

17. A non-transitory computer-readable storage medium that stores instructions for execution by one or more processors of a user equipment (UE) operating in a 5G network, the instructions to configure the one or more processors for New Radio (NR) communications and to cause the UE to:
receive a first radio resource control (RRC) configuration information received from a base station, the first RRC configuration information including a channel quality indicator (CQI) table indication identifying a CQI table;
receive a second RRC configuration information, the second RRC configuration information including an MCS table indication identifying an MCS table, the identified MCS table comprising one of a first MCS table and a second MCS table;
transmit, to the base station, channel state information (CSI), the CSI including a CQI index associated with the CQI table, the CQI index for MCS selection by the base station; and
receive scheduling including a downlink (DL) grant using the identified MCS table, wherein if the first MCS table is identified, a higher TCR is selected based on a MCS index than if the second MCS table is identified, wherein the second MCS table includes the following modulation order and target code rate for MCS index values of 0-5:

| MCS Index $I_{MCS}$ | Modulation Order $Q_m$ | Target code Rate R × [1024] | Spectral efficiency |
|---|---|---|---|
| 0 | 2 | 30 | 0.0586 |
| 1 | 2 | 40 | 0.0781 |
| 2 | 2 | 50 | 0.0977 |
| 3 | 2 | 64 | 0.1250 |
| 4 | 2 | 78 | 0.1523 |
| 5 | 2 | 99 | 0.1934 |

18. The non-transitory computer-readable storage medium of claim 17, wherein the instructions cause the UE to:
determine the CQI index for reporting as part of the CSI based on the CQI table indication and a transport block error probability associated with the CQI table.

19. The non-transitory computer-readable storage medium of claim 18, wherein the instructions cause the LYE to:
determine the transport block error probability is 0.1 or 0.00001 and is determined based on the CQI table indication.

20. The non-transitory computer-readable storage medium of claim 17, wherein the CQI table is as follows:

| CQI index | modulation | code rate × 1024 | efficiency |
|---|---|---|---|
| 0 | | out of range | |
| 1 | QPSK | 30 | 0.0586 |
| 2 | QPSK | 50 | 0.0977 |
| 3 | QPSK | 78 | 0.1523 |
| 4 | QPSK | 120 | 0.2344 |
| 5 | QPSK | 193 | 0.3770 |
| 6 | QPSK | 308 | 0.6016 |
| 7 | QPSK | 449 | 0.8770 |
| 8 | QPSK | 602 | 1.1758 |
| 9 | 16QAM | 378 | 1.4766 |
| 10 | 16QAM | 490 | 1.9141 |
| 11 | 16QAM | 616 | 2.4063 |
| 12 | 64QAM | 466 | 2.7305 |
| 13 | 64QAM | 567 | 3.3223 |
| 14 | 64QAM | 666 | 3.9023 |
| 15 | 64QAM | 772 | 4.5234 |

\* \* \* \* \*